United States Patent [19]
Arimoto

[11] Patent Number: 6,104,486
[45] Date of Patent: *Aug. 15, 2000

[54] FABRICATION PROCESS OF A SEMICONDUCTOR DEVICE USING ELLIPSOMETRY

[75] Inventor: Hiroshi Arimoto, Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/774,272

[22] Filed: Dec. 27, 1996

[30] Foreign Application Priority Data

Dec. 28, 1995 [JP] Japan ..................... 7-343924

[51] Int. Cl.⁷ .................................... G01J 3/00
[52] U.S. Cl. ................... 356/300; 356/305; 356/310; 356/322; 356/337; 356/340; 356/345; 356/351; 356/364; 356/128; 250/492.1; 250/492.2; 250/492.22; 250/492.3
[58] Field of Search ................... 356/300, 305, 356/310, 322, 337, 340, 345, 351, 364, 128; 250/492.1, 492.2, 492.22, 492.3

[56] References Cited

U.S. PATENT DOCUMENTS

| 4,653,924 | 3/1987 | Itonaga et al. | 356/369 |
| 5,349,197 | 9/1994 | Sakamoto et al. | 250/492.22 |
| 5,404,019 | 4/1995 | Ohno et al. | 250/492.22 |

FOREIGN PATENT DOCUMENTS

| 57-132039 | 8/1982 | Japan . |
| 58-206120 | 12/1983 | Japan . |
| 61-4905 | 1/1986 | Japan . |

OTHER PUBLICATIONS

"Ultraviolet–visible ellipsometry for process control during the etching of submicrometer features", N. Blayo et al., AT&T Bell Laboratories, Murray Hill, New Jersey (Sep. 28, 1994); Optical Society of America, vol. 12, No. 3/Mar. 1995, pp. 591–599.

Primary Examiner—Christopher L. Chin
Assistant Examiner—Bao-Thuy L. Nguyen
Attorney, Agent, or Firm—Armstrong, Westerman, Hattori, McLeland & Naughton

[57] ABSTRACT

A method of fabricating a semiconductor device includes the steps of illuminating a structure formed on a surface of a substrate by an incident optical beam incident to the structure with a predetermined incident angle with respect to the surface, measuring a polarization state of an exiting optical beam exiting from the structure in response to an illumination of the structure by the incident optical beam, and evaluating a size of the structure in a direction parallel to the surface from the polarization state of the exiting optical beam, and adjusting a parameter of production of a semiconductor device in response to the size.

11 Claims, 24 Drawing Sheets

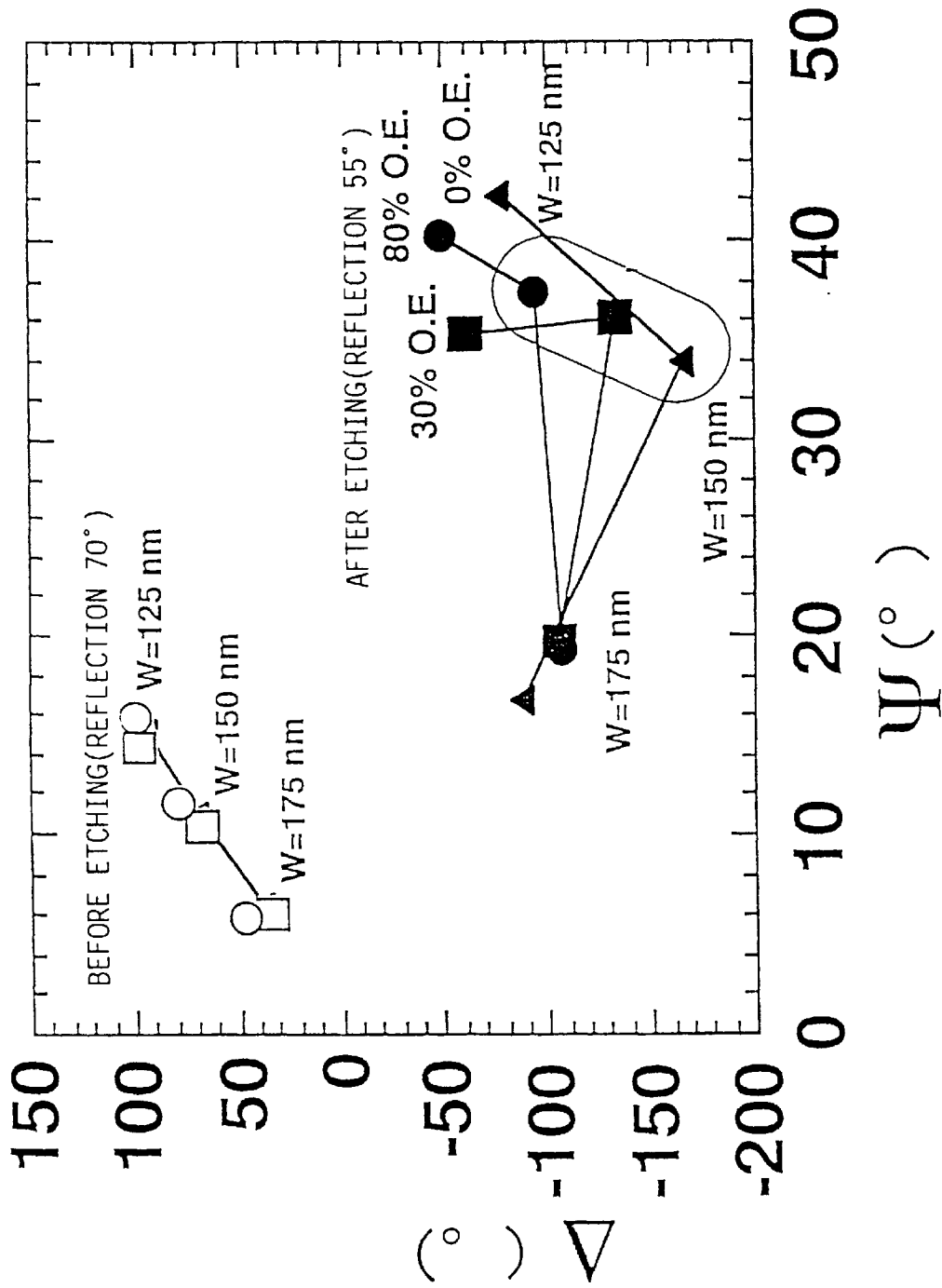

0% O.E.

150 nm

30% O.E.

150 nm

80% O.E.

150 nm

F I G. 2 3
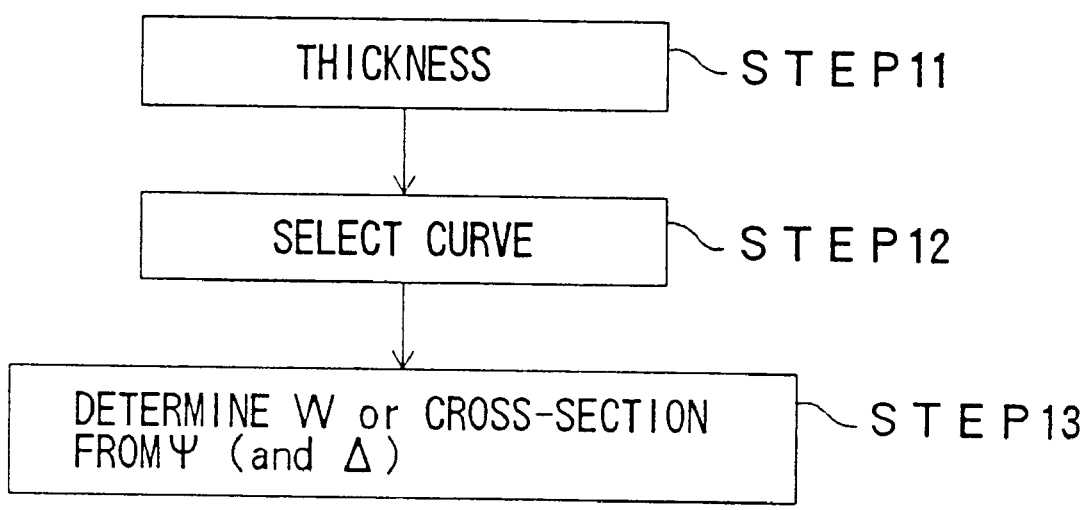

FABRICATION PROCESS OF A SEMICONDUCTOR DEVICE USING ELLIPSOMETRY

BACKGROUND OF THE INVENTION

The present invention generally relates to fabrication of semiconductor devices and more particularly to a measurement of profile of a semiconductor structure formed on a wafer during a fabrication process of the semiconductor device.

In a production line of semiconductor devices, it is necessary to examine the size of the structures such as agate pattern formed on a wafer quickly, without contacting to or destroying the structure, such that the result of the measurement is fed back immediately to the production line for optimizing various parameters of the production line. Particularly, there is a demand for an exact control for gate lengths, as a gate length provides a profound effect on the threshold characteristic of the semiconductor device that uses a gate structure.

Conventionally, a wafer carrying thereon a structure such as a gate pattern is subjected to a scanning process conducted under a scanning electron-microscope (SEM) for evaluation of the size of the structure. Further, there is a known process for evaluating the gate pattern size by measuring a resistance of the wafer by a bridge circuit that is formed commonly to the gate pattern on the same wafer.

However, the examination process that uses a SEM takes a substantial time due to the need of transporting each wafer on the production line consecutively to a vacuum chamber of the SEM. Thus, it is not practical to apply such an SEM process to all of the wafers on the line. Further, even when the SEM process is applied only to selected wafers, a decrease of throughput is inevitable for the production of the semiconductor devices. In the case of recent miniaturized semiconductor devices having a gate length, or other structural parameters, of 0.1 μm or less, in particular, the foregoing SEM process tends to cause an error in the result of the measurement due to the finite or non-infinitesimal diameter of the focused electron beam used in the SEM as compared with the size of the structure, wherein the magnitude of the error can reach as much as 10 nm.

In the case of measuring the resistance by using the bridge circuit, on the other hand, the result of the measurement cannot be obtained until the fabrication of the semiconductor devices on the wafer is completed, although the problem pertinent to the case of using a SEM such as the poor accuracy or reproducibility of the measurement may be resolved successfully. Thus, the process cannot be used for an in-situ feedback control of the production line.

Meanwhile, the art of ellipsometry has been used in the fabrication of semiconductor devices for measurement of thickness of semiconductor films and insulation films. Further, the ellipsometry is used also for controlling an etching process at the time of formation of line-and-space patterns (Blayo, N., et al., "Ultraviolet-visible ellipsometry for process control during the etching of submicrometer features,", J. Opt. Soc. Am., A, vol. 12, no. 3, 1995, pp. 591–599).

FIGS. 1A and 1B show the construction of an ellipsometer using conventionally for ellipsometry, wherein FIG. 1A shows a rotary-photometry type apparatus while FIG. 1B shows an extinction-photometry type apparatus.

Referring to FIG. 1A, the ellipsometer includes an optical source 1 for emitting an optical beam, wherein the optical beam emitted from the optical source 1 is converted to a linearly polarized beam having a predetermined plane of polarization and the linearly polarized beam thus formed hits a specimen 3 on which a film to be measured is formed. After reflection by the specimen 3, the linearly polarized beam is converted to an elliptically polarized beam characterized by an angle ø indicating the direction of the major axis of the ellipse and an ellipticity k defined as $k=a_{min}/a_{max}$ as indicated in FIG. 2, wherein the parameters ø and k are related to ellipsometric parameters $\psi$ and $\Delta$ to be used later in the description according to the relationship $$\tan 2\psi = \tan 2\phi \cdot \cos \Delta \text{ and}$$

$$\sin 2\chi = \sin 2\phi \cdot \sin \Delta,$$

where there holds a relationship of $$\tan \psi = \rho_p/\rho_s \text{ and}$$

$$\tan \chi = k = a_{min}/a_{max}.$$

In other words, it is possible to convert the set of the parameters (k, ø) obtained by the photometry to the parameters ($\psi$, $\Delta$). It should be noted that the parameter $\Delta$ represents the phase shift of the optical beam.

The elliptically polarized beam thus formed is then detected by a detector 5 after passing through a rotatable analyzer 4, wherein the ellipsometer of FIG. 1A carries out the detection of the intensity of the optical beam reaching the detector 5 while rotating the analyzer 4. Further, a quarter-wavelength plate 4a, which induces a phase shift of a one-quarter of wavelength in the optical beam passing therethrough, may be inserted between the analyzer 4 and the specimen 3 as necessary.

In the ellipsometer of FIG. 1B, on the other hand, a rotary quarter-wavelength plate 4b is inserted between the rotary analyzer 4 and the specimen 3, and the elliptically polarized beam reflected by the specimen 3 is converted once to a linearly polarized beam. The rotary analyzer 4 is thereby rotated in search of the extinction angle in which the optical beam reaching the detector 5 is interrupted.

As explained previously, the ellipsometer of FIGS. 1A or 1B has been used successfully for the measurement of film thickness in the fabrication process of semiconductor devices. On the other hand, it should be noted that such conventional ellipsometry has hitherto discarded the information about the lateral size of the structure, which the polarized optical beam has inherently picked up when passing through the structure laterally. In conventional ellipsometry, there has been no proposal to make use of the ellipsometry for measuring the lateral size of the structure such as a line-and-space pattern formed on the specimen based upon the polarization state of the optical beam passed through the structure laterally.

SUMMARY OF THE INVENTION

Accordingly, it is a general object of the present invention to provide a novel and useful fabrication process of a semiconductor device wherein the foregoing problems are eliminated.

Another object of the present invention is to provide a fabrication process of a semiconductor device that uses ellipsometry for measuring the size of a structure formed on a wafer efficiently with high precision, without destroying or causing a damage to the structure.

Another object of the present invention is to provide a method of fabricating a semiconductor device, comprising the steps of:

illuminating a structure formed on a surface of a substrate by an incident optical beam incident to said structure with a predetermined angle with respect to said surface;

measuring a polarization state of an exiting optical beam exiting from said structure in response to an illumination of said structure by said incident optical beam; and evaluating a size of said structure in a direction parallel to said surface from said polarization state of said exiting optical beam;

said method further including a step of adjusting a parameter of production of a semiconductor device in response to said size.

Another object of the present invention is to provide a method of measuring a size of a structure formed on a surface of a substrate, comprising the steps of:

illuminating said structure by an incident optical beam incident to said structure with a predetermined angle with respect to said surface;

measuring a polarization state of an exiting optical beam exiting from said structure in response to an illumination of said structure by said incident optical beam; and evaluating a size of said structure in a direction parallel to said surface from said polarization state of said exiting optical beam.

Another object of the present invention is to provide a method for controlling a quality of a semiconductor device, comprising the steps of:

illuminating a structure formed on a surface of a substrate by an incident optical beam incident to said structure with a predetermined angle with respect to said surface;

measuring a polarization state of an exiting optical beam exiting from said structure in response to an illumination of said structure by said incident optical beam; and evaluating a size of said structure in a direction parallel to said surface from said polarization state of said exiting optical beam.

According to the present invention, it becomes possible to measure the size of the pattern formed on a wafer easily in a short time during the fabrication process of a semiconductor device, without contacting to or without damaging the fabricated device. Further, the result of the measurement can be fed back immediately and in real time to the production line for controlling the quality of the semiconductor devices produced by the production line.

Other objects and further features of the present invention will become apparent from the following detailed description when read in conjunction with the attached drawings.

BRIEF DESCRIPTION OF THE DRAWINGS

FIG. 20 is a diagram showing the effect of pattern cross-sectional shape on the ellipsometric parameters $\psi$ and $\Delta$ according to a fifth embodiment of the present invention;

FIG. 23 is a flowchart showing a process of pattern evaluation according to the sixth embodiment.

DETAILED DESCRIPTION OF THE PREFERRED EMBODIMENTS

Principle

Figure 3:
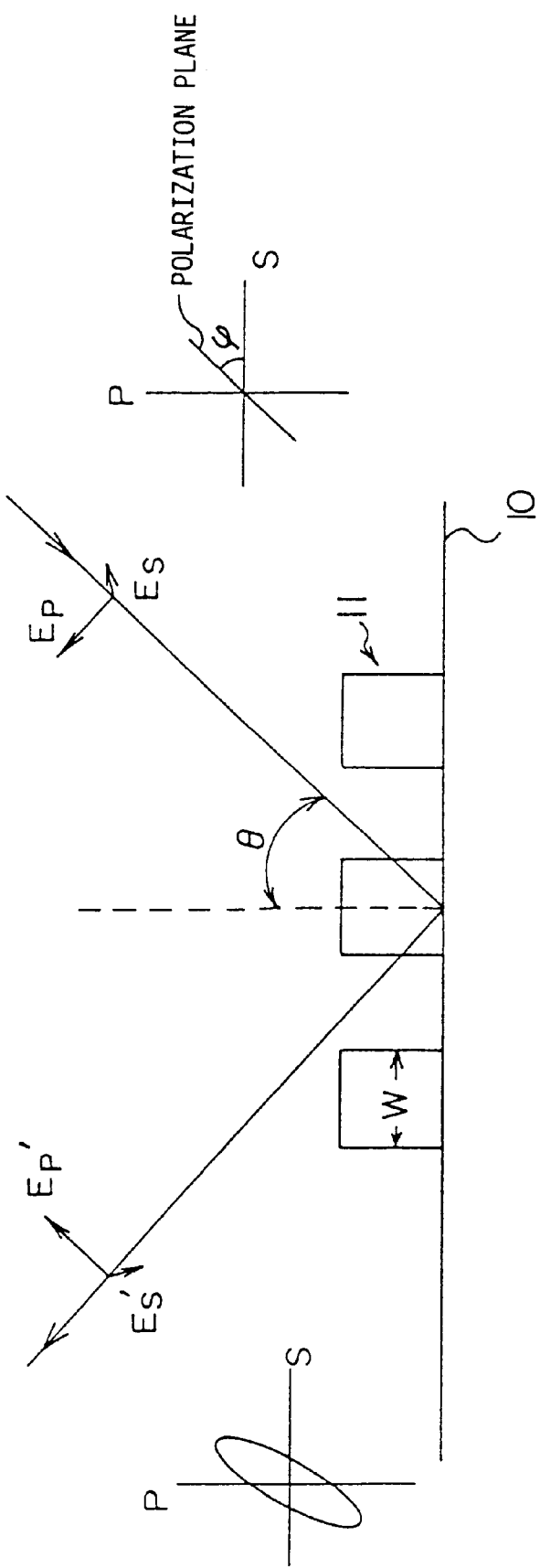
FIG. 3 is a diagram showing the principle of the present invention.

First, the principle of the present invention will be described with reference to FIG. 3 showing the process for obtaining a width W of a pattern 11 formed on a substrate 10 based upon a polarization state of an optical beam incident to the pattern 11.

Referring to FIG. 3, it should be noted that the incident optical beam enters the pattern 11 with an incident angle $\theta$, wherein the optical beam thus entering the pattern 11 is a linearly polarized beam having a polarizing angle $\phi$ and characterized by electric field components Ep and Es crossing with each other perpendicularly.

When the incident optical beam has crossed the pattern 11 from a first side thereof to a second opposite side thereof, the electric field components Ep and Es are changed respectively to Ep' and Es' due to the difference of refractive index and reflectance between the pattern 11 and the substrate 10 or between the pattern 11 and the air and further due to the phase difference caused in the optical beam as it passes through the pattern 11. The electric field components Ep' and Es' form an elliptically polarized beam.

Figure 4:
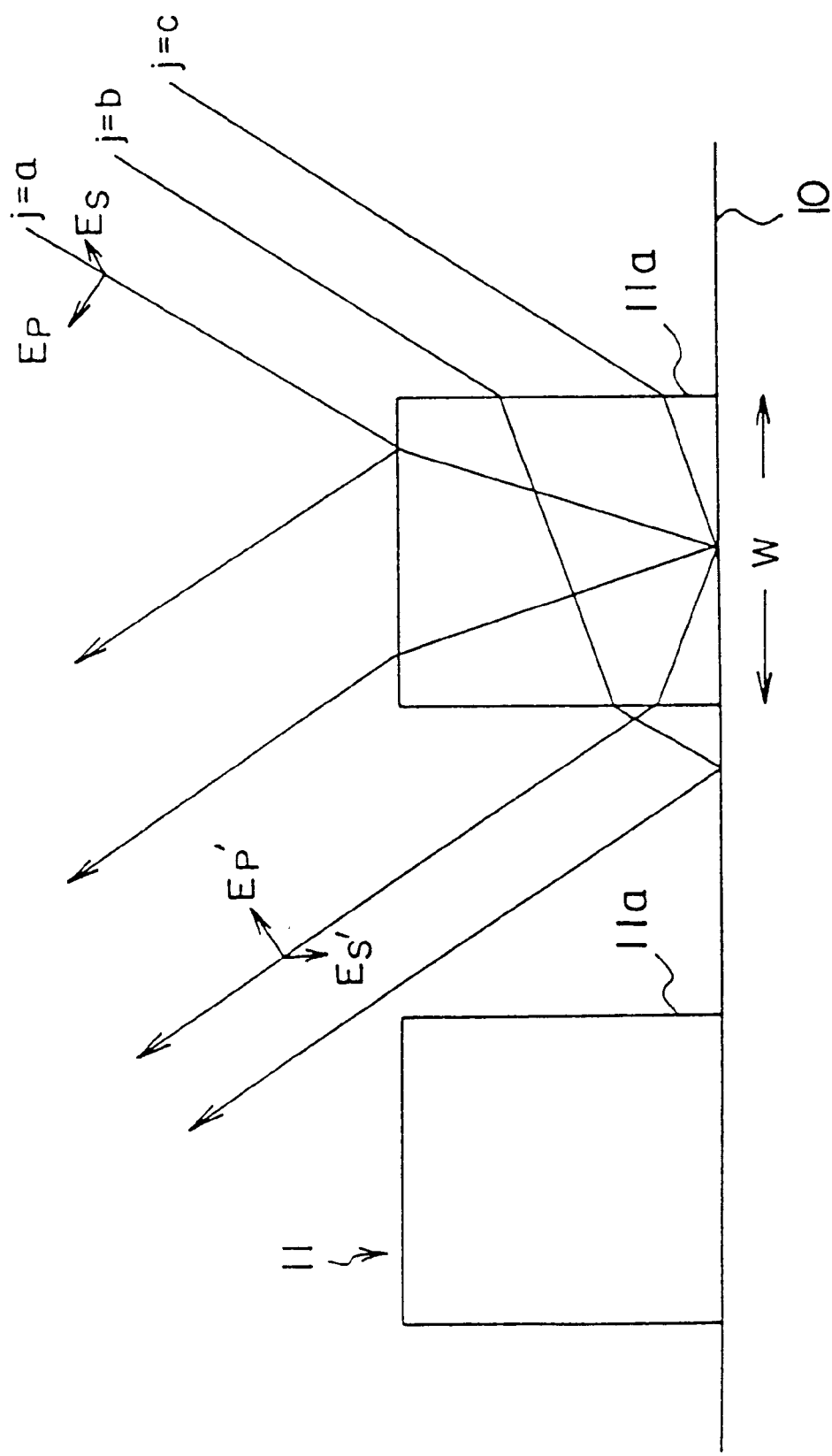
FIG. 4 is a diagram showing a part of FIG. 3 in an enlarged scale.

FIG. 4 shows a part of FIG. 3 in an enlarged scale.

Referring to FIG. 4, the pattern 11 includes pattern elements 11a and 11b, and linearly polarized optical beams a–c entering the pattern 11a exit therefrom as elliptically polarized optical beams after experiencing refraction and/or reflection.

For example, a monochromatic linearly polarized optical beam having a polarization angle of 45° and incident to the pattern of FIG. 4 with an incident angle θ forms an elliptically polarized optical beam after reflection, due to the change of reflectance at the interface between the pattern 11a and the underlying substrate 10 for each of the p- and s-components Ep and Es as well as due to the phase difference caused in the optical beam as it passes through the pattern 11a. In such a case, it is possible to obtain a complex reflection coefficient ratio Rp/Rs by means of an ellipsometer, wherein the foregoing ration Rp/Rs is determined by the factors such as the refractive index of the substrate 10, the refractive index of the pattern 11, the shape of the pattern 11 and the incident angle θ of the incident optical beam.

Figure 1A:
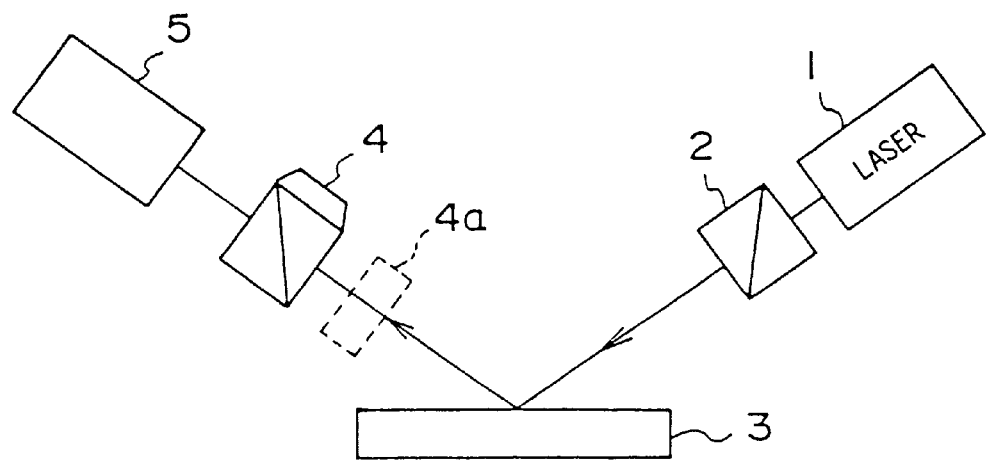
FIGS. 1A and 1B are diagrams showing the construction of a conventional ellipsometer.
Figure 1B:
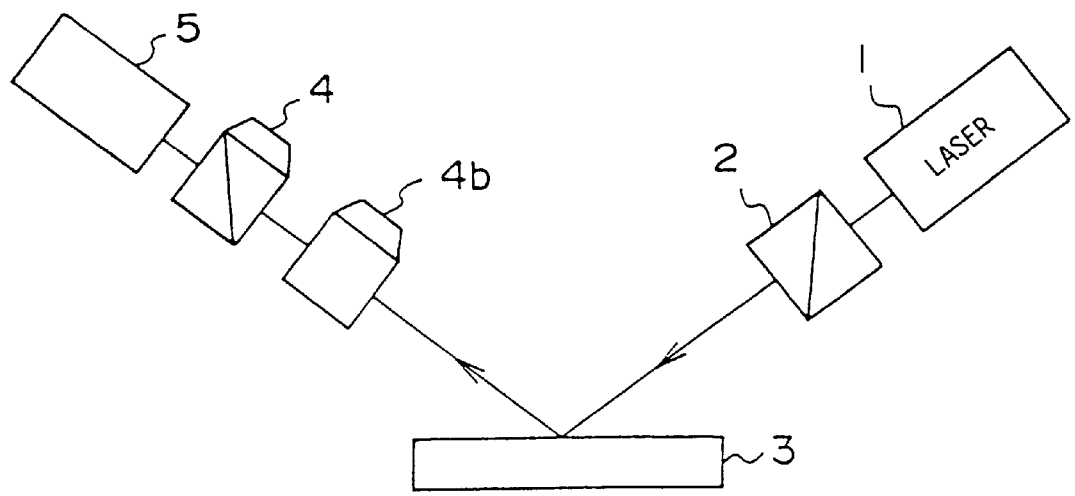
Figure 2:
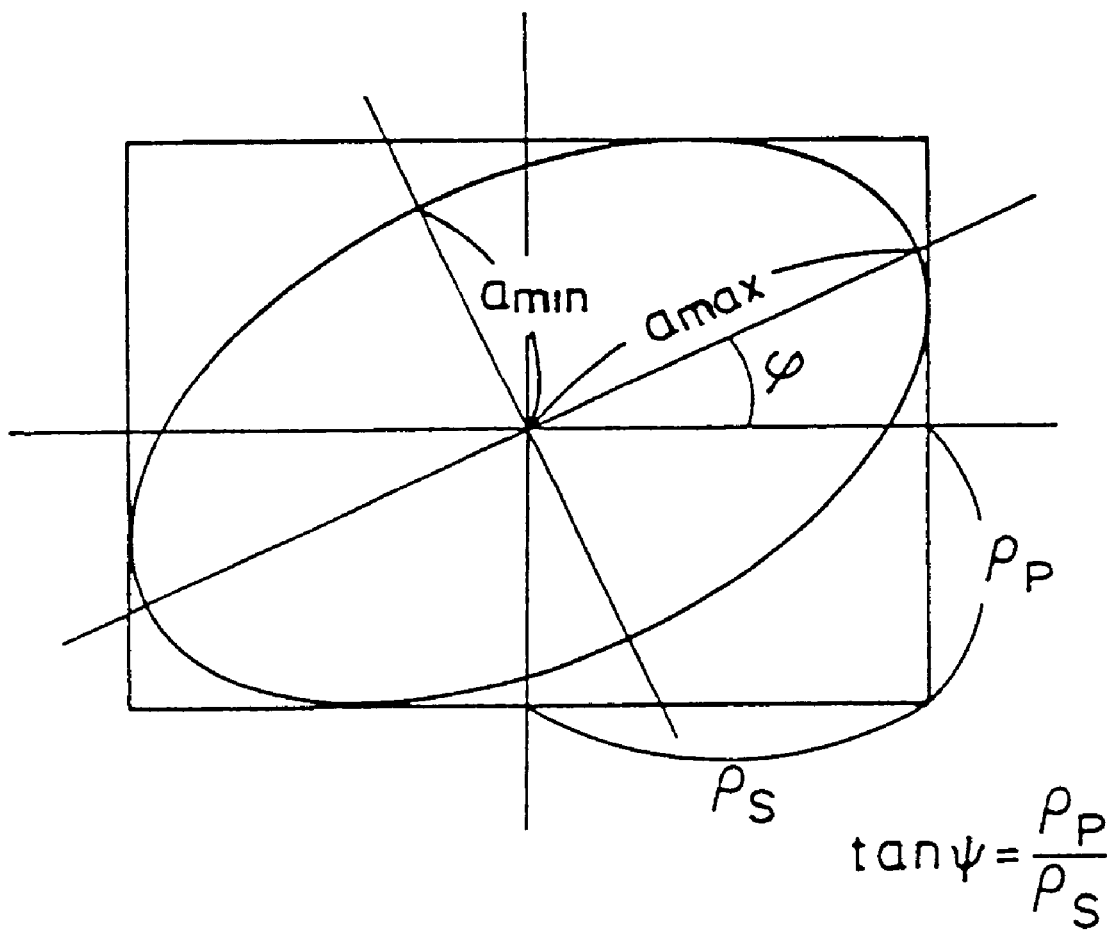
FIG. 2 is a diagram explaining the elliptical polarization measured by the ellipsometer of FIGS. 1A or 1B.

The ellipsometry using an ellipsometer provides parameters ψ and Δ as a result of the ellipsometric observation, wherein the parameters ψ and Δ are related to the complex reflection coefficient ratio Rp/Rs according to the relationship $$\rho = Rp/Rs = \sum_{j=1}^{n} Rp \Big/ \sum_{j=1}^{n} Rs = \tan\psi \exp(i\Delta), \quad (1)$$

where the parameter ψ is defined as $\tan\psi = \rho_p/\rho_s$ as indicated in FIG. 2, while Δ represents the phase difference. Both of the parameters ψ and Δ are the quantities observable by the ellipsometry as noted previously. In EQ. (1), it should be noted that the summation is taken for all of the rays that pass through the pattern 11.

Summarizing above, the parameters ψ and Δ are obtained from the elliptic polarization state of the exit optical beam that includes the components Ep' and Es' by means of ellipsometry, provided that the refractive index or dielectric constant of the substrate 10 as well as the refractive index or dielectric constant of the pattern 11 are specified and the incident angle of the incident optical beam is specified.

As will be seen in FIG. 4, the exit optical beam picks up the information bout the lateral size W of the pattern 11a in the form of phase difference, as the optical beam passes through the pattern 11a. Thus, it becomes possible to estimate the foregoing size W of the pattern 11a based upon the parameters ψ and Δ obtained from the polarization state of the exit optical beam. In an embodiment of the present invention to be described later, a number of sets of the parameters ψ and Δ are stored in a database in correspondence to various patterns of which size and shape are known for example by SEM observation. Thereby, the pattern size W is easily obtained by referring to the database based upon the parameters ψ and Δ observed by the ellipsometry.

FIRST EMBODIMENT

Figure 5:
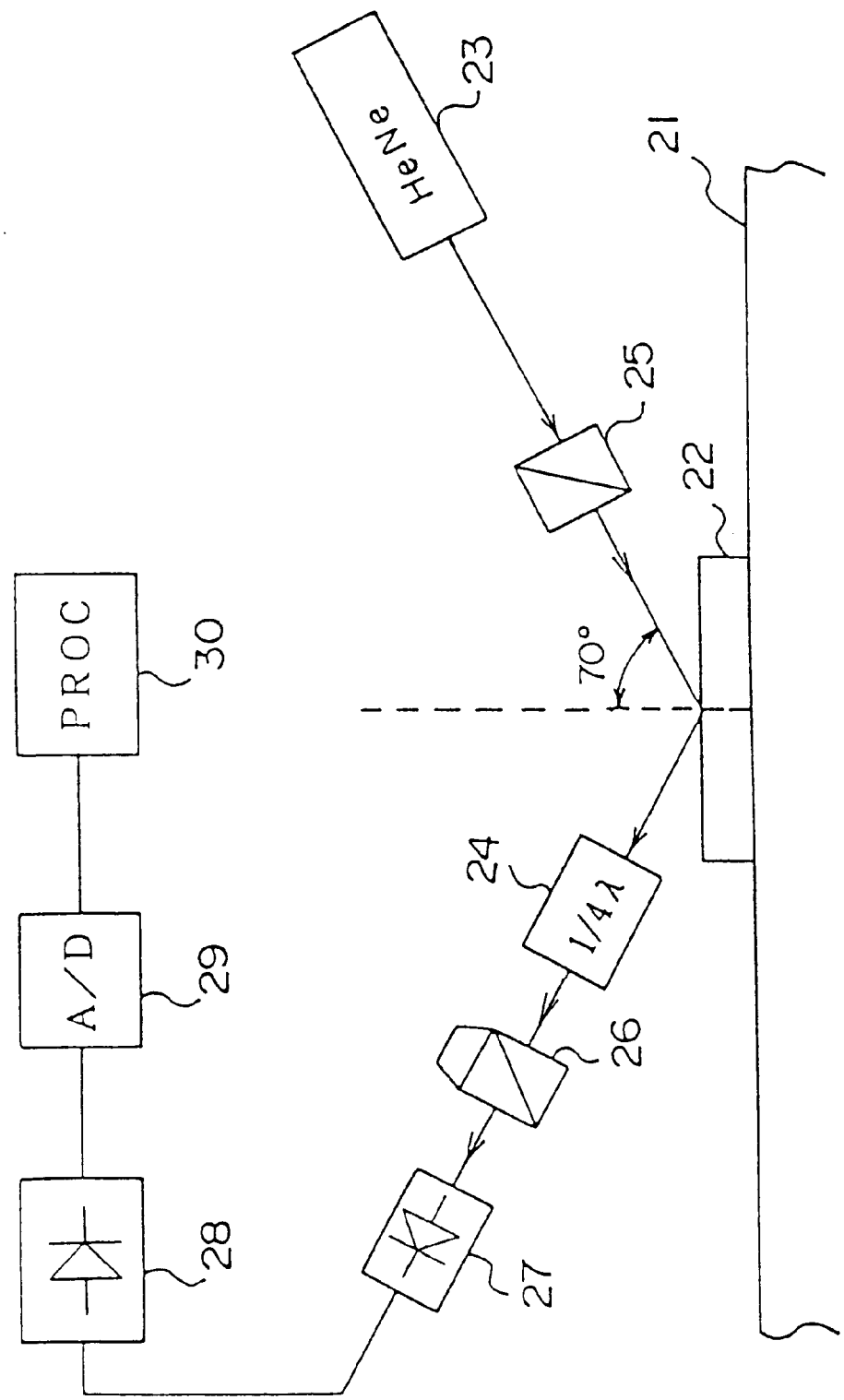
FIG. 5 is a diagram showing a first embodiment of the present invention.

FIG. 5 shows the construction of an ellipsometric apparatus sued for an ellipsometric size measurement of a pattern formed on a substrate according to a first embodiment of the present invention.

Referring to FIG. 5, a substrate 22 carrying a pattern thereof is mounted upon a stage 21 of the apparatus, and the substrate 22 is illuminated by an optical beam produced by a He-Ne laser 23. The optical beam thus produced has a wavelength of 6328 Å and is passed through a polarizer 25 such that the optical beam is converted to a linearly polarized optical beam having a predetermined polarization angle, which may be set to 45°. The linearly polarized optical beam thus produced then impinges upon the substrate 22 on the stage 21 with a predetermined incident angle such as 70°. Alternatively, it is possible to dispose the quarter-wavelength plate 24 between the substrate 22 and the polarizer 25.

The linearly polarized optical beam thus impinged upon the substrate 22 is then reflected after passing through a pattern formed on the substrate 22, wherein the optical beam, initially being a linearly polarized optical beam, is converted to an elliptically polarized optical beam. The elliptically polarized optical beam thus formed is further passed successively through a quarter-wavelength plate 24 and a rotary analyzer 26, wherein the rotary analyzer 26 converts the elliptically polarized optical beam again to a linearly polarized optical beam, and the linearly polarized optical beam thus obtained is detected by a photocell 27. The detection by the photocell 27 is carried out while rotating the analyzer 26.

The photocell 27 produces an output signal corresponding to the intensity of the optical beam incident thereto and supplies the output signal to a processing apparatus 30 after amplification by an amplifier 28 and an analog-to-digital conversion by an A/D converter 29. The processing apparatus 30 thereby obtains the polarization state of the optical beam incident to the photocell 27 and produces the foregoing parameters ψ and Δ.

Figure 6A:
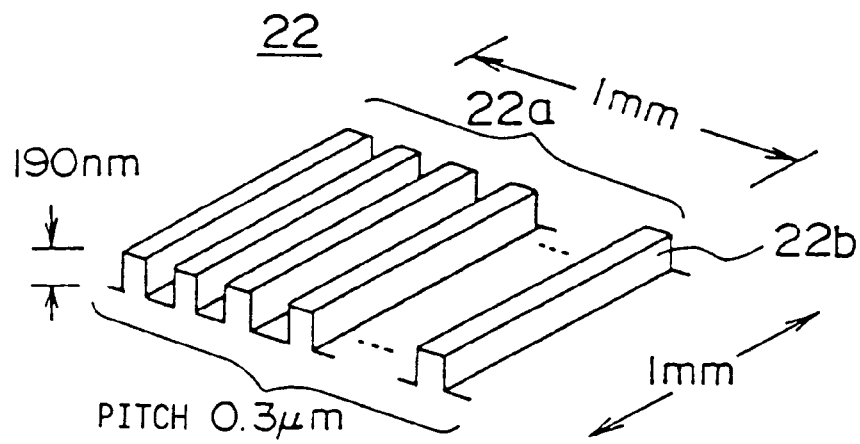
FIGS. 6A and 6B are diagrams showing a line-and-space pattern to which an ellipsometry of FIG. 5 is applied.
Figure 6B:
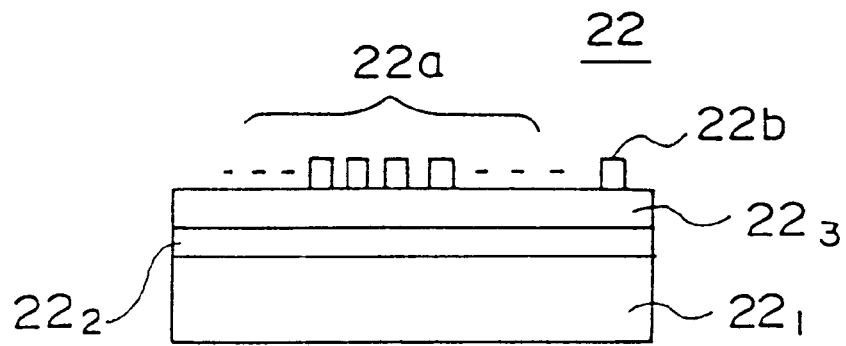

FIGS. 6A and 6B show an example of a resist pattern 22a formed on the substrate respectively in a perspective view and a cross-sectional view. The pattern 22a may be any suitable device pattern formed on the substrate or a line-and-space pattern formed on the substrate 22 at a suitable location such as a scribe line.

Referring to FIGS. 6A and 6B, the substrate 22 includes a silicon substrate $22_1$ on which a silicon oxide film $22_2$ and a polysilicon film $22_3$ are deposited successively with respective thicknesses of 100 nm and 153 nm, and the foregoing resist pattern 22a is formed on the polysilicon film $22_2$. Various resist materials can be used for the resist pattern 22a such as the CMS resist (trade name) for electron beam exposure, which is available from Toyo Soda Manufacturing Company, Japan.

The resist pattern 22a may be a line-and-space pattern in which a plurality of mutually parallel pattern elements 22b are repeated with a predetermined pitch such as 0.3 μm and is formed on a suitable location of the substrate 22 with a size of generally 1 mm×1 mm. Each of the pattern elements 22b has a height of 150 nm as a result of patterning of a resist film having a thickness of 150 nm. In such a line-and-space pattern, it should be noted that, while the pattern pitch can be controlled exactly, the width of the individual pattern elements 22b may vary variously. When such a line-and-space pattern is used for the gate electrode of a MOS transistor, such a variation of the pattern width can cause an unwanted deviation of the threshold voltage of the MOS transistor to be formed.

Figure 7:
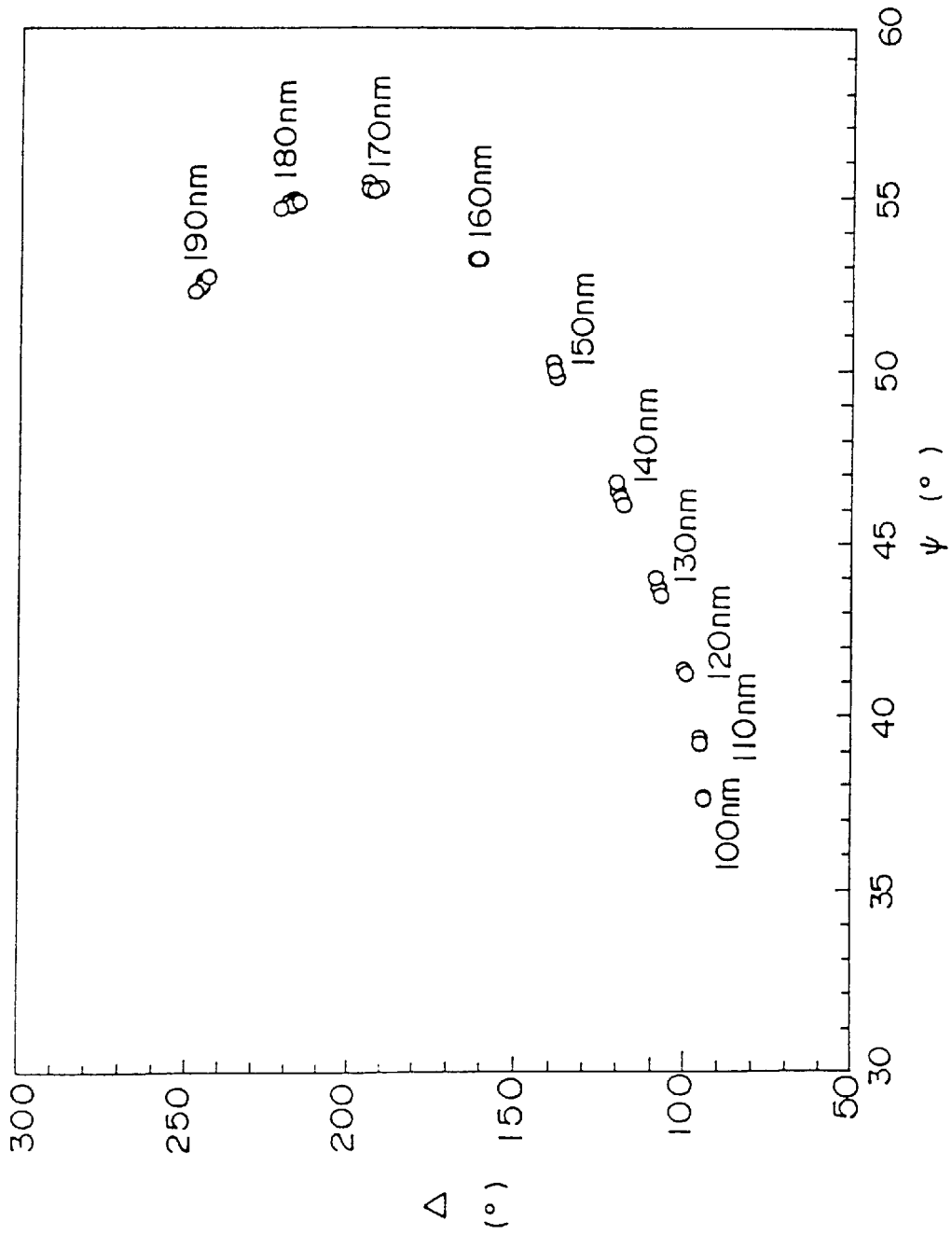
FIG. 7 is a diagram showing an example of a database used in the ellipsometry of FIG. 5.

FIG. 7 shows the relationship between the parameters ψ and Δ obtained experimentally for the case in which the apparatus of FIG. 5 is applied to a line-and-space pattern while changing the pattern width W variously. In the experiment, the substrate shown in FIGS. 6A in 6B is used for the substrate 22, and the parameters ψ and Δ were obtained while changing the width W of the pattern element 22b from 100 nm to 190 nm. It should be noted that the value of the width W shown in FIG. 7 is obtained by directly observing the line-and-space pattern by a SEM. The parameters ψ and Δ were obtained for each pattern width W five times.

As will be seen from FIG. 7, there is a one-to-one correspondence between each set of the parameters ψ and Δ and the width W. This means that it is possible to estimate the value of the width W of the line-and-space pattern on the substrate by measuring the parameters ψ and Δ by referring to the relationship of FIG. 7. Thus, the relationship of FIG. 7 is stored in a database provided in the processing apparatus 30 of FIG. 5, and the processing apparatus 30 refers to the database for the evaluation of the width W.

Figure 8:
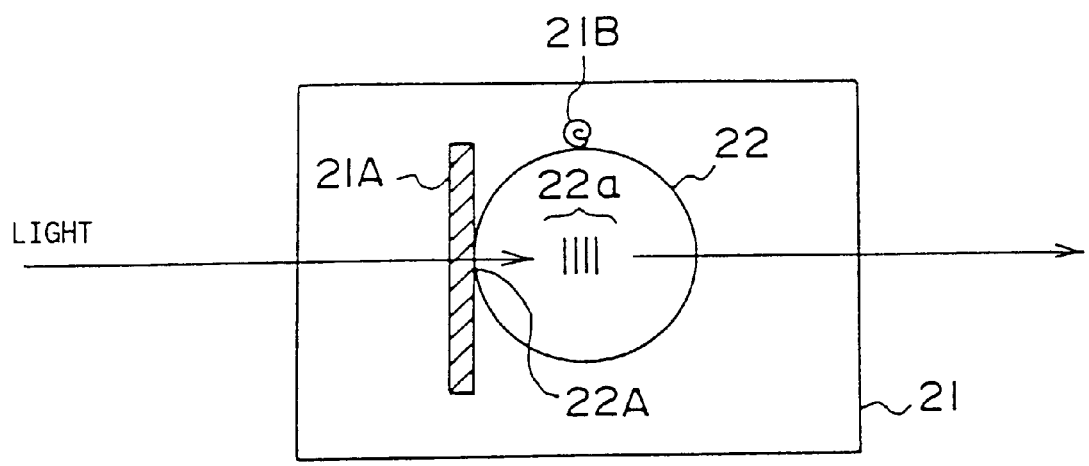
FIG. 8 is a diagram showing a positioning of a wafer in the construction of FIG. 5.

FIG. 8 shows the apparatus of FIG. 5 in a plan view.

Referring to FIG. 8, the stage 21 carries a positioning member 21A for engagement with an orientation flat 22A formed on a wafer that forms the substrate 22 as well as a positioning pin 21B for engagement with a side wall of the wafer 22.

In the state of FIG. 8 in which the orientation flat 22A engages the positioning member 21A and the side wall of the substrate 22 engages the positioning pin 21B on the stage 21, it should be noted that the pattern elements 22b forming line-and-space pattern 22a on the substrate 22 extend generally perpendicularly to the path of the optical beam traveling from the laser 23 when viewed in a direction perpendicular to the substrate 22. By disposing the line-and-space pattern 22a in such a direction, it should be noted that the optical beam efficiently picks up the information of the line-and-space pattern in the form of the phase of the optical beam. In other words, the sensitivity of detection of the pattern width W becomes maximum for the line-and-space pattern 22a by disposing the substrate 22 on the stage 21 in the orientation indicated in FIG. 8.

It should be noted that the foregoing alignment of the wafer for proper orientation can be made by various other means. For example, the wafer 21 may be formed with a cut with a predetermined orientation such that the cut engages with a positioning pin provided on the stage 21 when the wafer 22 is placed on the stage 21 with a proper orientation. Alternatively, it is possible to use an orientation detection mechanism that uses an LED (light emitting diode) for the detection of the wafer orientation.

It is of course possible to dispose the wafer 22 in the construction of FIG. 8 such that the parallel pattern elements of the pattern 22a extend generally parallel to the path of the optical beam. By disposing the wafer 22 as such, it is possible to obtain the information about the wafer underneath the pattern 22a is obtained.

SECOND EMBODIMENT

Figure 9:
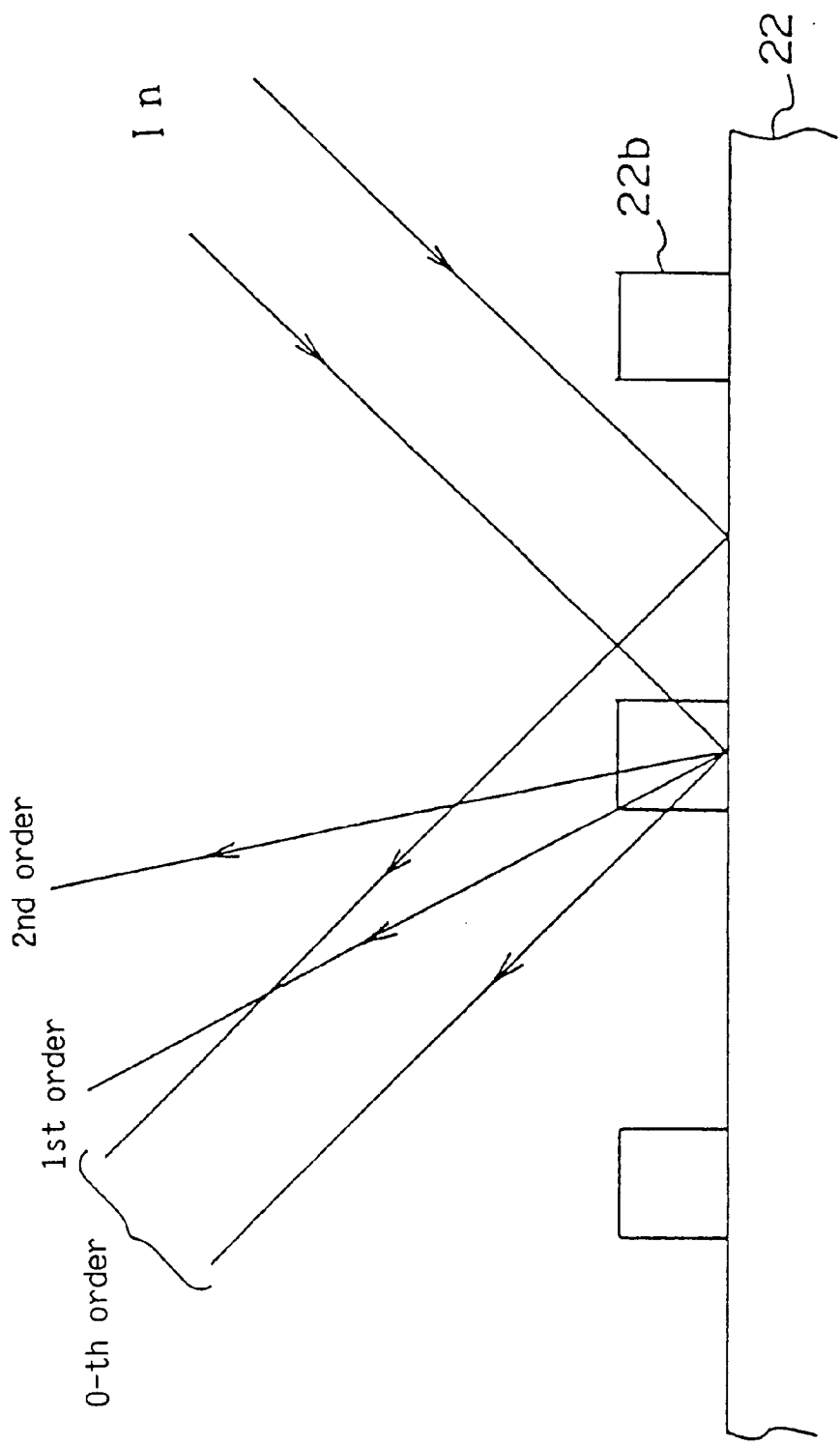
FIG. 9 is a diagram showing an ellipsometry according to a second embodiment of the present invention.

FIG. 9 shows a second embodiment of the present invention, wherein those parts described previously with reference to preceding drawings are designated by the same reference numerals and the description thereof will be omitted.

Referring to FIG. 9, it will be noted that the pattern elements 22b are formed relatively sparsely on the substrate 22. Thus, the optical beam emitted from the optical source 23 tends to pickup not only the information of the pattern elements 22b but also the information of the underlying substrate 22 such as the thickness of a film forming a top part of the substrate 22. In such a case, there is a substantial risk that the width W obtained from the ellipsometric parameters ψ and Δ deviates from the real value of the width W.

Thus, the present invention exploits the coherent nature of the optical beam 23, which is a He-Ne laser, and obtains the pattern width W from diffraction optical beams that are produced by the line-and-space pattern 22a as a result of Bragg diffraction. In this case, one or more photocells are disposed so as to detect one or more of such diffraction optical beams. Thereby, the pattern width W is obtained based upon the observed ellipsometric parameters ψ and Δ similarly to the previous embodiment. In the present embodiment, it is also possible to obtain the most reliable value from the width W by taking a simple average or weighted average of the width W obtained by various diffraction beams.

Figure 10:
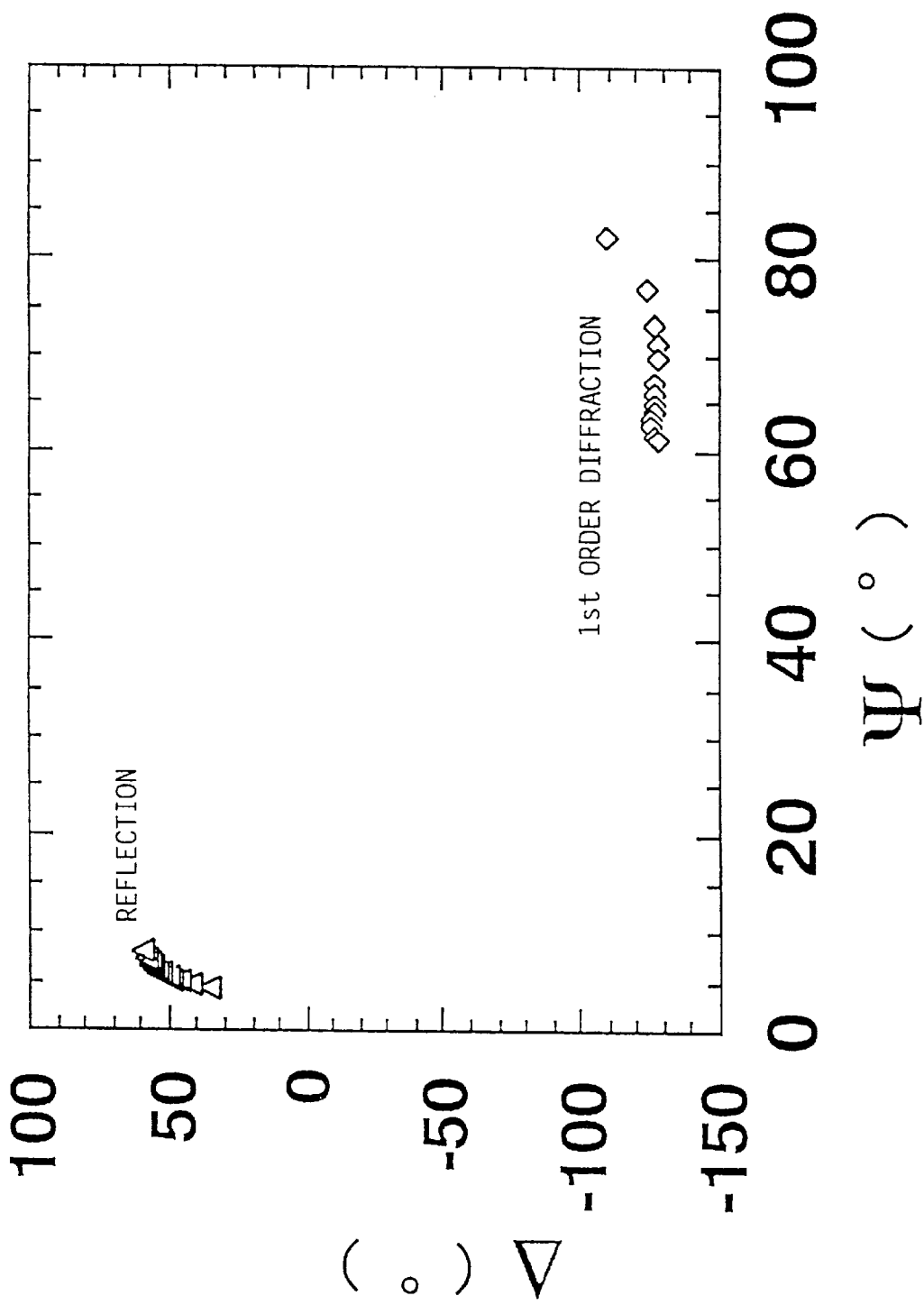
FIG. 10 is a diagram showing an example of using a reflection beam and a first-order diffraction beam in the ellipsometry of FIG. 9.

FIG. 10 shows the examples of the parameters ψ and Δ obtained form the diffraction optical beam according to the process of FIG. 9 for a specimen in which a line-and-space resist pattern having a height of 150 μm is formed with a 5 μm-pitch, in comparison with the parameters ψ and Δ obtained from the reflected beam for the same line-and-space pattern. In the example of FIG. 10, it should be noted that the incident angle of the optical beam is set to 77° and hence the reflection beam is formed with a reflection angle of 77°. On the other hand, the first-order diffraction beam is produced with a diffraction angle of 58°.

FIG. 10 clearly indicates that the value of the parameters ψ and Δ changes when the width W of the line-and-space pattern is changed in the range between 110 nm–210 nm, wherein it should be noted that the parameters ψ and Δ change respectively in the range of 5–10° and 30–60° when the reflection beam is used, while the parameters ψ and __ change respectively in the range between 60–85° and −100—−110° when a first-order diffraction optical beam is used. The result of FIG. 10 indicates further that the change of the phase difference Δ is small when the first-order diffraction beam is used. In such a case, the width W is generally proportional to the parameter ψ.

THIRD EMBODIMENT

Figure 11:
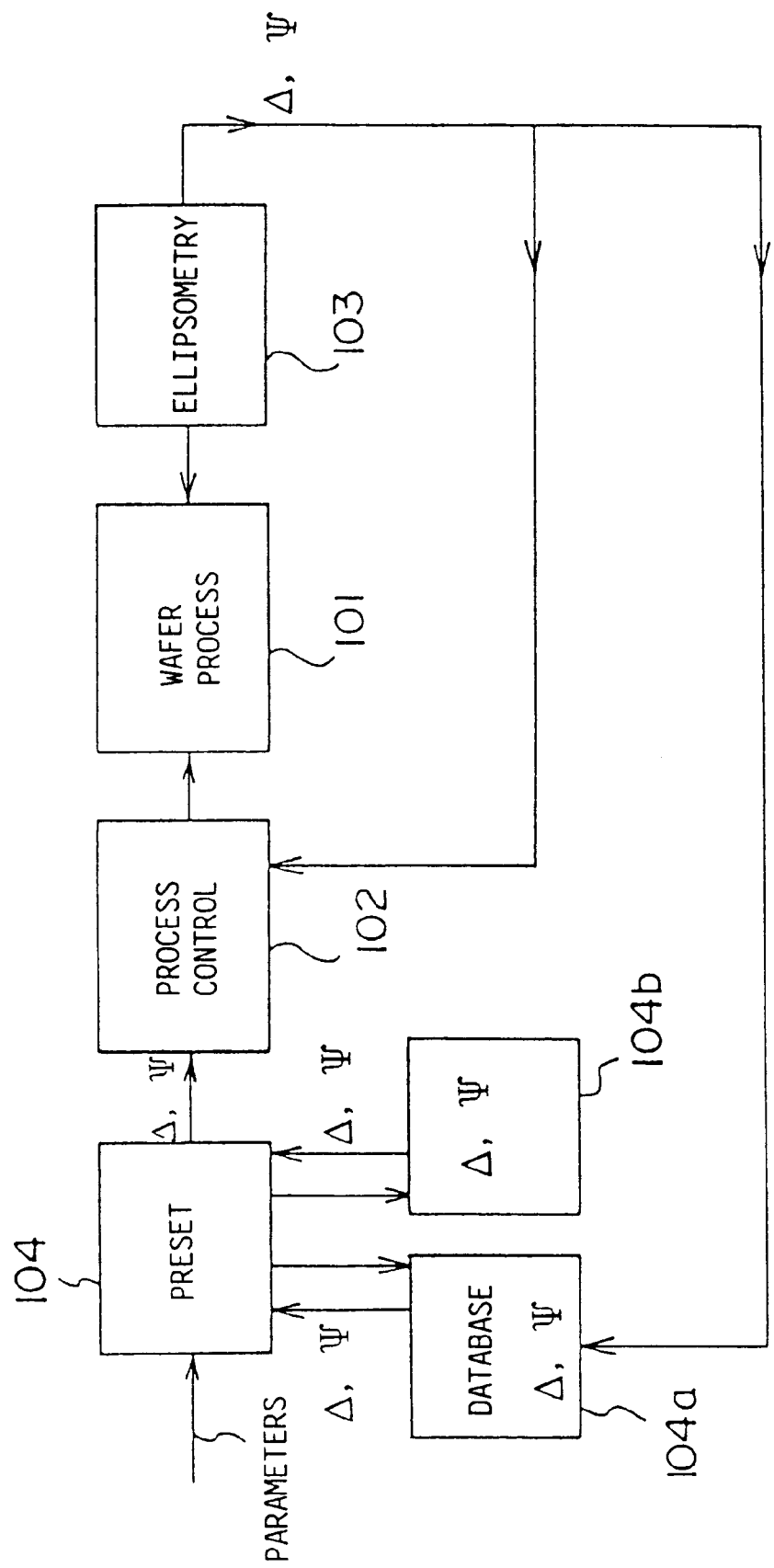
FIG. 11 is a diagram showing a production line of a semiconductor device in which the ellipsometry of FIG. 5 is used according to a third embodiment of the present invention.

FIG. 11 is a block diagram showing the construction of a production line of semiconductor devices according to a third embodiment of the present invention that uses the ellipsometer of FIG. 5.

Referring to FIG. 11, the production line includes a wafer processing part 101 that may include in turn processes such as an exposure process and an etching process, and a control part 102 that controls the wafer processing part 101 as usual in a semiconductor process, wherein the production line of FIG. 11 further includes an ellipsometry part 103 that examines the wafer processed by the processing part 101.

The ellipsometry part 103 includes the ellipsometer of FIG. 5 and obtains the ellipsometric parameters ψ and Δ based upon the polarization of an optical beam reflected from the wafer that has been processed by the processing part 101. The ellipsometric parameters ψ and Δ thus obtained are then supplied to the control part 102, wherein the control part changes the process condition such as the exposure dose, exposure time, RF power, and the like, based on the comparison of the observed parameters ψ and Δ with corresponding present values of the parameters ψ and Δ that are supplied from a presetting part 104.

As indicated in FIG. 11, the presetting part 104 is supplied with pattern data such as the thickness and shape of the line-and-space pattern formed in the wafer process part 101 or other various data such as the thickness of the layer formed under the line-and-space pattern, and calculates the expected values of the parameters ψ and Δ be referring to a database 104a that holds the parameters ψ and Δ similarly to FIG. 7. Thereby, the control part 102 compares the parameters ψ and Δ obtained from the database 104a with the parameters ψ and Δ obtained by the ellipsometer 103 and controls the process in the processing part 102 such that the difference between the parameters ψ and Δ of the database 104a and the actually observed parameters ψ and Δ is minimized.

In the production line of FIG. 11, it should be noted that the database 104a is constructed by examining the wafers of which pattern size is already known by a SEM scanning, by using the ellipsometer 103 and by storing the ellipsometric parameters ψ and Δ thus obtained as a function of the shape parameter such as the width W.

Alternatively, the parameters ψ and Δ may be calculated theoretically in the system of FIG. 11 by using a theoretical calculation unit 104b, such that the theoretically obtained parameters ψ and Δ are supplied to the process control part 102 via the presetting part 104.

The theoretical calculation of the parameters ψ and Δ in the calculation unit 104b is conducted generally as follows.

Figure 12:
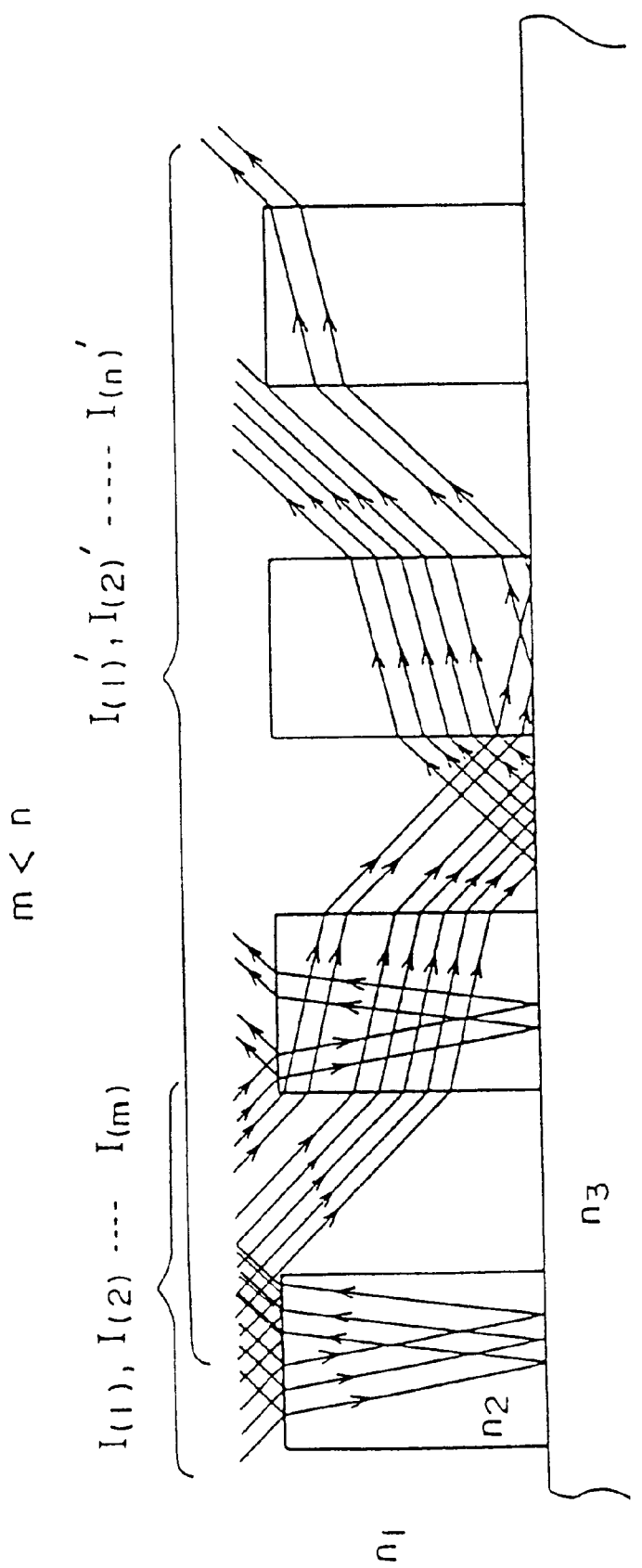
FIG. 12 is a diagram showing the principle for calculating the ellipsometric parameters $\psi$ and $\Delta$ in the ellipsometry of FIG. 11.

When an optical beam is incident to a specimen carrying thereon a periodic line-and-space pattern with an incident angle $\theta_1$, the incident optical beam experiences refractions and reflections according to the Snell's law as it passes through the specimen as indicated in FIG. 12, and the optical beam exits from the line-and-space pattern with the same angle $\theta_1$. In FIG. 12, it should be noted that the environment of the specimen has a refractive index $n_1$ while the line-and-space pattern has a refractive index $n_2$. Further, the substrate on which the line-and-space pattern is formed, has a refractive index $n_3$.

Thus, the incident optical beam is divided into m incident rays $I_{(1)}, I_{(2)}, \ldots, I_{(m)}$ and the optical path is calculated for each of the incident rays $I_{(1)}, I_{(2)}, \ldots I_{(m)}$ by applying the Snell's law. In such a calculation, each of the rays is decomposed into a p-polarization component and an s-polarization component and the effect of attenuation associated with reflection and refraction is calculated for each of the p- and s-components.

More specifically, the effect of attenuation associated with the reflection of an incident ray is evaluated by multiplying Fresnel's amplitude reflectance coefficients $r_p$ and $r_s$ to the amplitude $I_0$ of the p-component and s-component of the incident ray respectively each time the incident ray experiences a reflection. When the incident ray experiences a refraction, on the other hand, Fresnel's amplitude refraction coefficients $t_p$ and $t_s$ are multiplied respectively to the intensity $I_0$ of the p- and s-components of the incident ray each time the incident ray experiences a refraction. Further, the effect of attenuation caused by an opaque medium is evaluated by multiplying an amplitude transmittance coefficient $t_k$.

The final intensity Ip(n)' and Is(n)' respectively of the p- and s- components are then obtained by further multiplying the effect of phase retardation δ associated with the optical path length, wherein the amplitude reflectance coefficients $r_p$ and $r_s$, the amplitude refraction coefficients $t_p$ and $t_s$, the amplitude transmittance coefficient $t_k$, and the phase retardation δ are given respectively as $$r_p = \tan(\theta_1 - \theta_2)/\tan(\theta_1 + \theta_2),$$

$$r_s = -\sin(\theta_1 - \theta_2)/\sin(\theta_1 + \theta_2),$$

$$t_p = 2\sin\theta_2 \cos\theta_1/\sin(\theta_1+\theta_2)\cos(\theta_1-\theta_2),$$

$$t_s = 2\sin\theta_2 \cos\theta_1/\sin(\theta_1+\theta_2),$$

$$t_k = \exp(-2\pi k d/\lambda), \text{ and}$$

$$\delta = \exp(-i2\pi n d/\lambda),$$

wherein λ represents the wavelength of the incident optical beam while d represents the optical path length of the optical beam in the specimen.

Figure 13:
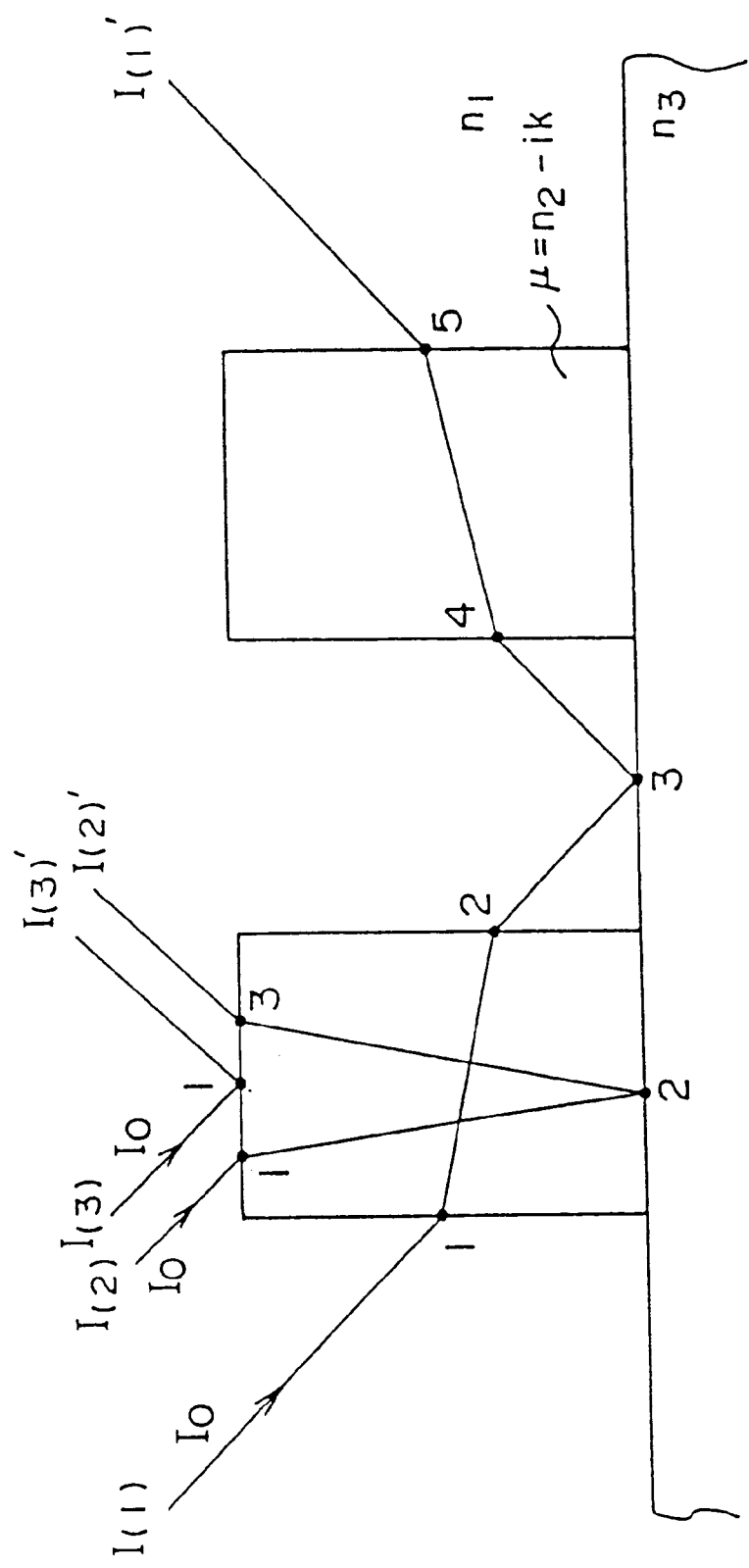
FIG. 13 is another diagram showing the principle for calculating the ellipsometric parameters $\psi$ and $\Delta$ in the ellipsometry of FIG. 11.

In the example of FIG. 13, incident rays (1)–(3) having an initial intensity $I_0$ form exiting rays having p-components Ip(1)'–Ip(3)' and s-components Is(1)'–Is(3)' given as $$Ip(1)' = t_{p1}t_{p2}r_{p3}t_{p4}t_{p5} \times \exp(-2\pi k_2 d_1/\lambda) \exp(-i2\pi n_2 d_1/\lambda) \cdot I_0,$$

$$Is(1)' = t_{s1}t_{s2}r_{s3}t_{s4}t_{s5} \times \exp(-2\pi k_2 d_1/\lambda) \exp(-i2\pi n_2 d_1/\lambda) \cdot I_0,$$

$$Ip(2)' = t_{p1}r_{p2}t_{p3} \times \exp(-2\pi k_2 d_2/\lambda) \exp(-i2\pi n_2 d_2/\lambda) \cdot I_0,$$

$$Is(2)' = t_{s1}r_{s2}t_{s3} \times \exp(-2\pi k_2 d_2/\lambda) \exp(-i2\pi n_2 d_2/\lambda) \cdot I_0,$$

$$Ip(3)' = r_{p1} \cdot I_0, \text{ and}$$

$$Is(3)' = r_{s1} \cdot I_0,$$

wherein $n_2$ and $k_2$ represent the refractive index and absorption coefficient of the line-and-space pattern, while $d_1$ and $d_2$ represent respectively the optical path lengths of the rays (1) and (2) in the line-and-space pattern. Further, the suffices 1–5 represent the point of reflection or refraction counted from the side where the rays enter the line-and-space pattern. See FIG. 13.

After the intensities I(1)'–I(n)' are thus obtained, the complex reflection coefficient ratio (Rp/Rs) is obtained according to the relationship $$Rp/Rs = \Sigma Ip(n)'/\Sigma Is(n)' = \tan\psi \exp(i_{66})$$

and the parameters are obtained according to the relationships of $$\psi = \tan^{-1}(|Rp/Rs|) \text{ and}$$

$$\Delta = \arg(Rp/Rs).$$

In the construction of FIG. 11, the calculation unit 104b carries out the foregoing calculation and supplies the obtained parameters ψ and Δ to the process control unit 102 via the presetting unit 104 as noted already.

Figure 14:
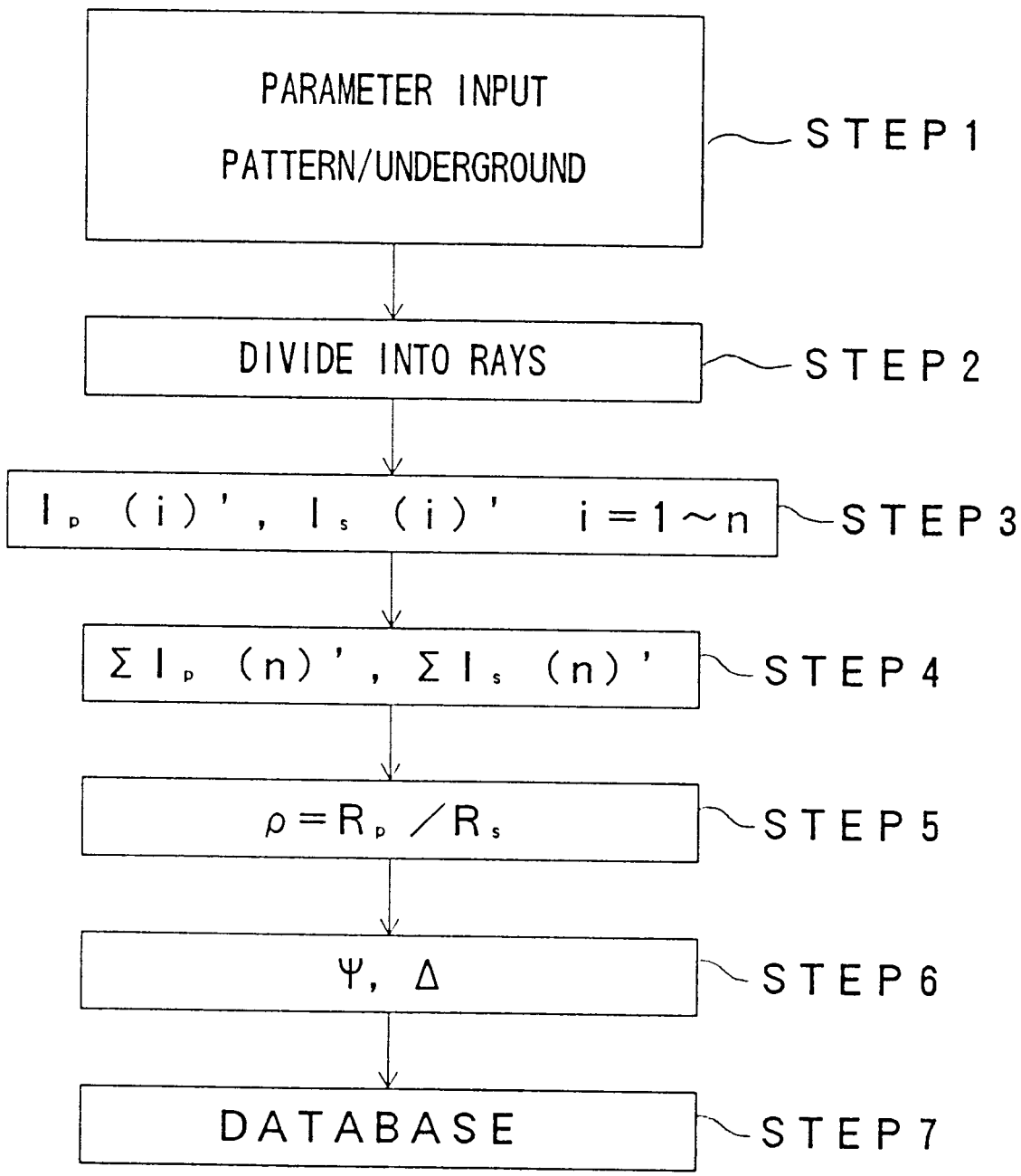
FIG. 14 is a flowchart showing the process conducted in the system of FIG. 11.

FIG. 14 is a flowchart showing the processing carried out by the calculation unit 104b.

Referring to FIG. 14, the process starts with a step 1 in which various structural data such as the thickness, refractive index and absorption of the pattern, the thickness, refractive index and absorption of the underlying layer, the pattern pitch, and the like are given in the form of input.

Next, in a step 2, the incident optical beam is decomposed into individual rays 1–n, and the optical path is obtained for each of the rays thus decomposed. Further, the intensities Ip(i)' and Is(i)' of the p- and s- components are obtained in a step 3 for each of the rays i(=1–n).

Further, in the step 4, the intensities Ip(i)' and Is(i)' obtained previously for the rays i are summarized respectively for all of the rays 1–n, and integral intensities ΣIp(n)' and ΣIs(n)' are obtained. The integral intensities thus obtained are then used in the step 5 to obtain the complex reflection coefficient ratio ΣIp(n)/ΣIs(n), and the complex reflection coefficient ratio ΣIp(n)/ΣIs(n) thus obtained is used in a step 6 to calculate the parameters ψ and Δ. Further, in a step 7, a reference is made to the database for the specific combination of the parameters ψ and Δ obtained in the step 6, and the value of the pattern W is obtained as a result of such a reference of the database.

Figure 15:
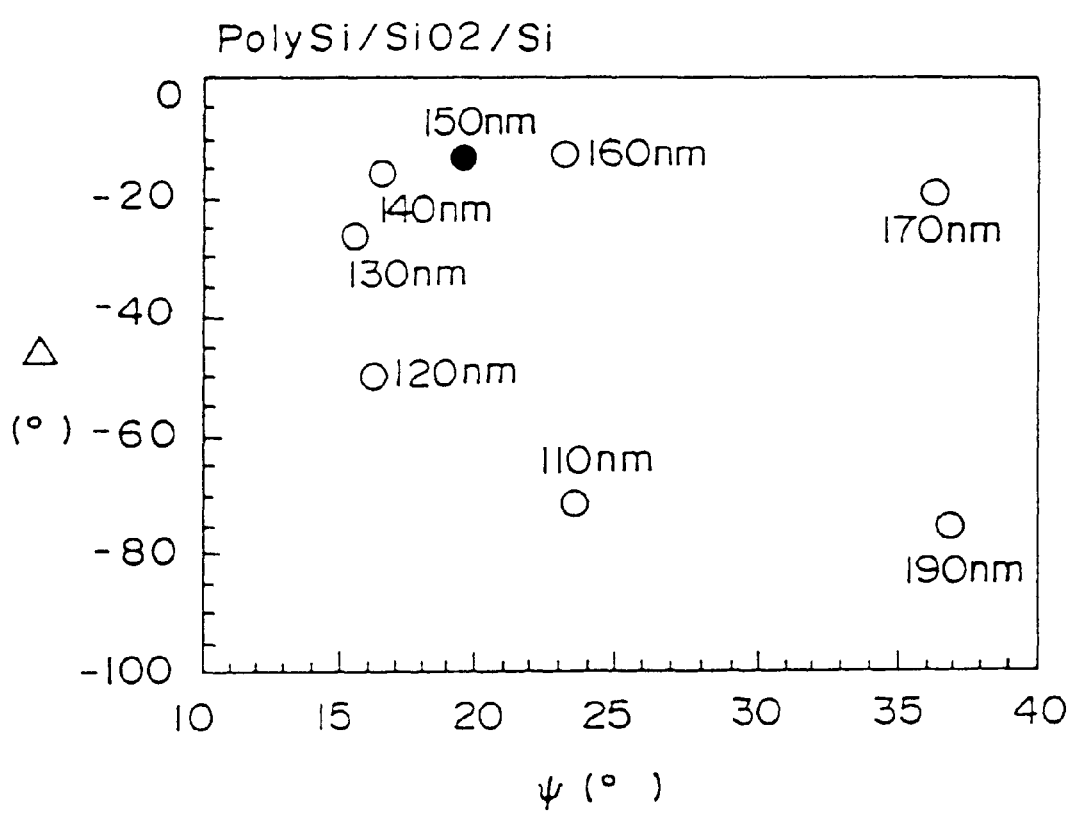
FIG. 15 is a diagram showing the relationship between the ellipsometric parameters $\psi$ and $\Delta$ and a pattern width W obtained in the ellipsometry of FIG. 5 for a line-and-space pattern formed by an etching process.

FIG. 15 shows the relationship between the parameter ψ and Δ obtained by the ellipsometer of FIG. 5 for the substrate 22 described previously with reference to FIGS. 6A and 6B, for a state in which an RIE (reactive ion etching) process is applied to the polysilicon layer $22_2$ while using the resist pattern 22a as a mask and the resist pattern 22a is removed subsequently. In the example of FIG. 15, it should be noted that the incident angle of the incident optical beam is set to 55°, not 70°. By accumulating the relationship of FIG. 15 for various patterns, the database 104a is constructed.

Figure 16:
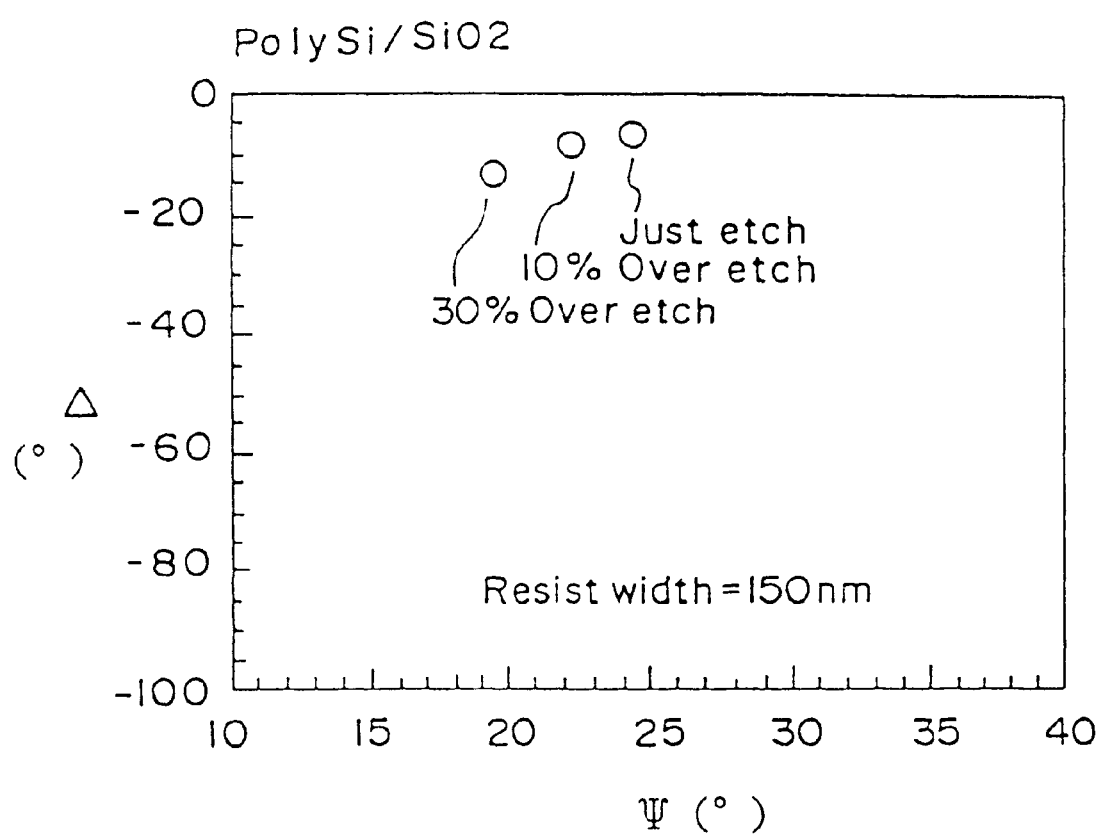
FIG. 16 is a diagram showing the change of the ellipsometric parameters $\psi$ and $\Delta$ with the progress of etching observed by the ellipsometry of FIG. 5.

FIG. 16, on the other hand, indicates the relationship of the parameters ψ and Δ observed for the case in which the line-and-space pitch of the mask pattern 22a is set to 150 nm in the embodiment of FIGS. 6A and 6B. In FIG. 16, it should be noted further that the duration of the etching process is changed variously. Thus, FIG. 16 shows the results in which an excessive etching is applied to the polysilicon layer $22_2$ by 10% and 30%, in addition to the case in which the etching is terminated exactly upon the exposure of the underlying $SiO_2$ layer $22_1$.

When such an excessive etching process is applied in such an RIE process for forming the line-and-space pattern in the polysilicon layer $22_2$, it is known that the line-and-space pattern thus formed experiences a substantial side wall etching. For example, when an excessive etching of 30% is made, it is known, from a SEM observation, that the line-and-space pattern thus formed experiences a side wall etching of as much as 20 nm. The result of FIG. 16 clearly indicates that the present invention for applying ellipsometry to line-and-space patterns for the measurement of the pattern width W is effective also for detecting the side wall etching of the pattern within a precision of about 10 nm.

FOURTH EMBODIMENT

Figure 17:
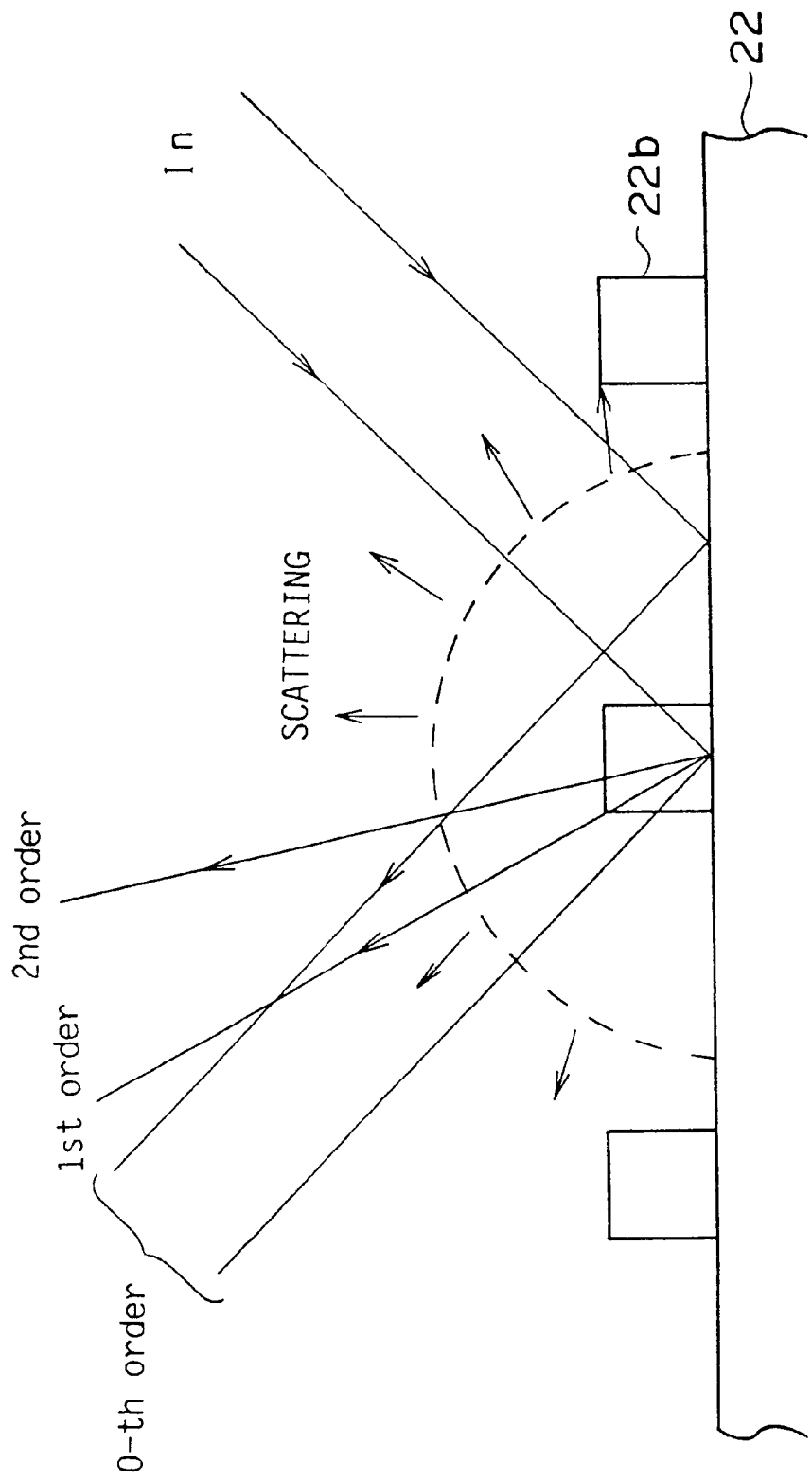
FIG. 17 is a diagram explaining the principle of a fourth embodiment of the present invention.

FIG. 17 shows the principle of a fourth embodiment of the present invention.

Referring to FIG. 17, the present embodiment obtains the foregoing ellipsometric parameters ψ and Δ based upon the scattering of an incident optical beam In caused by the pattern 22b on the substrate 22, rather than using a reflection beam or diffraction beam of the incident optical beam.

Figure 18:
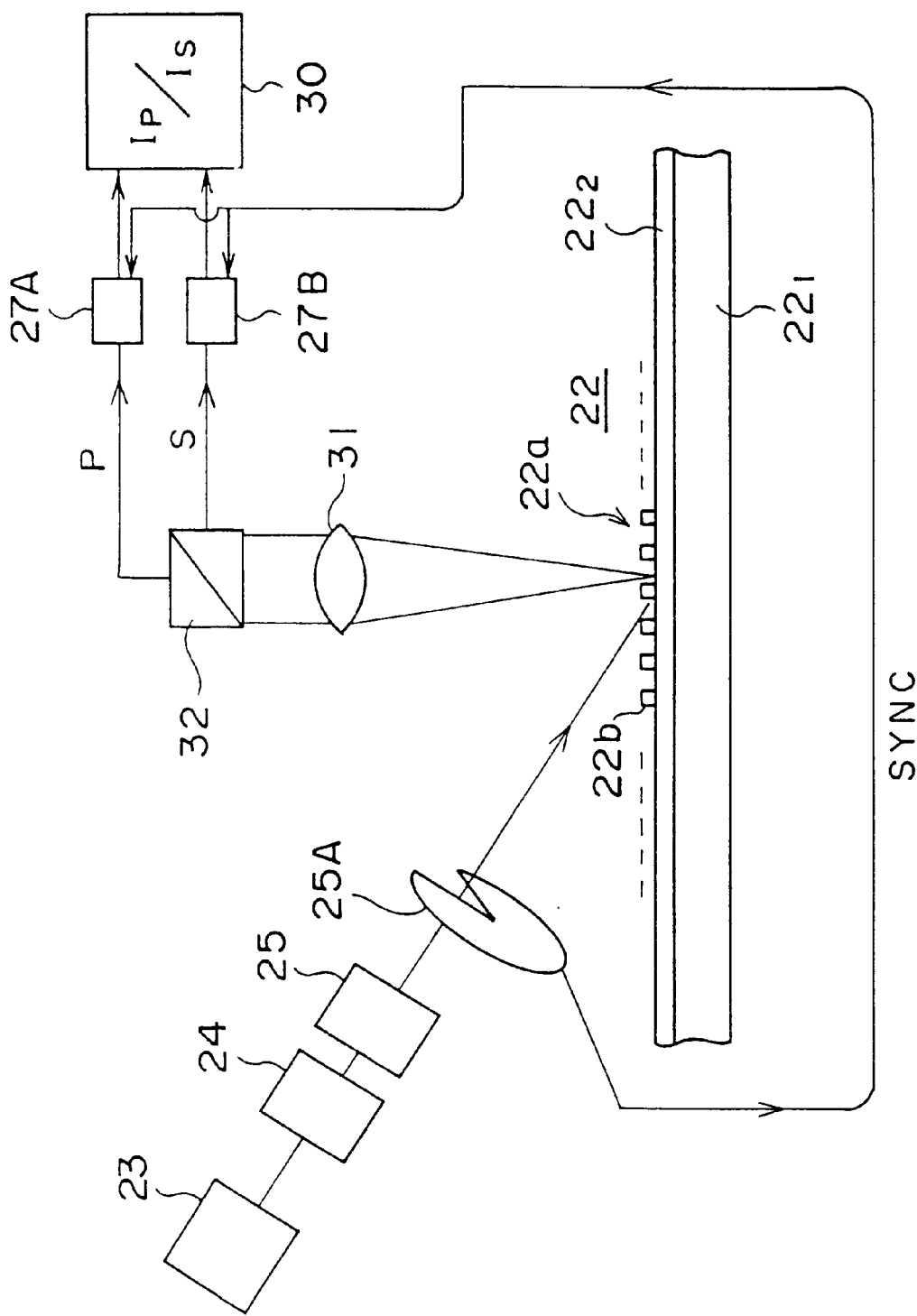
FIG. 18 is a diagram showing the details of the ellipsometry of FIG. 17.

FIG. 18 shows the construction for carrying out the measurement of a scattered light indicated in FIG. 17, wherein those parts described previously are designated by the same reference numerals and the description thereof will be omitted.

In the apparatus of FIG. 18, the coherent optical beam emitted from the optical source 23 reaches the wafer 22 which carries thereon the pattern 22a, after passing through the polarizer 25 and further through a beam chopper 25A, wherein the beam chopper 25A is a rotary disk formed with a cutout at a part thereof for turning on and turning off the optical beam incident to the wafer 22 from the optical source 23.

Further, the construction of FIG. 18 includes a lens 31 and a beam splitter 32 cooperating with the lens 31, wherein the lens 31 is disposed so as to avoid the reflection beam or diffraction beam produced by the pattern 22a on the wafer 22. Thereby, the beam splitter 32 decomposes the scattered light produced by the pattern 22a and focused by the lens 31 into the p-component and the s-component and supplies the p- and s-components thus decomposed to a detector 27A and a detector 27B respectively. The detectors 27A and 27B are supplied with a control signal from the beam chopper 25A as a synchronizing signal SYNC and detect the intensities Ip and Is of the scattered light respectively, wherein the control signal is used in the beam chopper 25A for controlling the rotation thereof and hence the on-off control of the optical beam. According to such a construction, it becomes possible to detect the intensities Ip and Is of feeble scattering light with high precision, by comparing the detected intensity with the background intensity in which the incident optical beam is interrupted.

The intensities Ip and Is of the scattered light thus obtained is then processed in the processing apparatus 30, wherein a calculation is made in the processing apparatus 30 to divide the intensity Ip by the intensity Is (Ip/Is), to obtain a reflection coefficient ratio tanψ and hence the ellipsometric parameter ψ.

Figure 19:
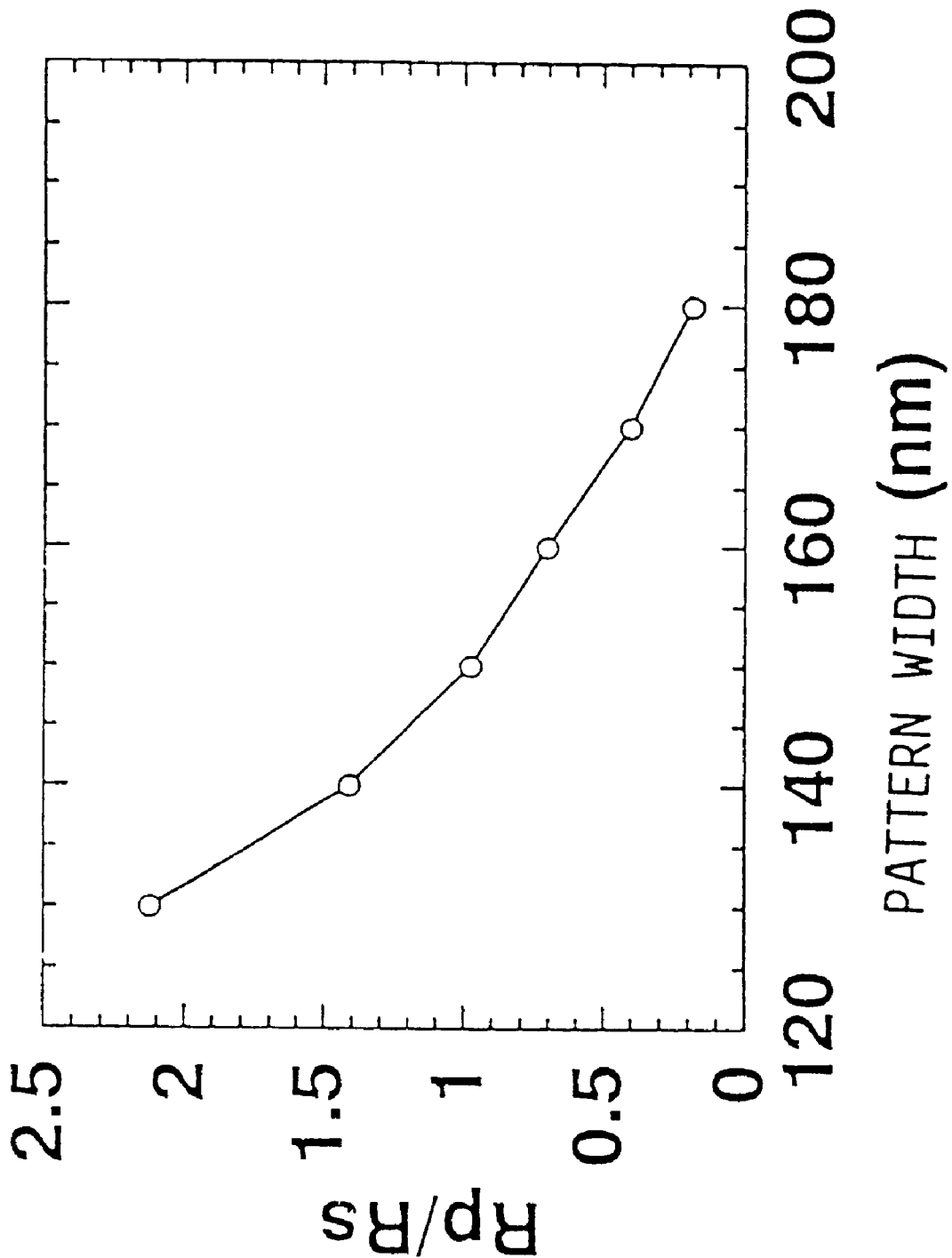
FIG. 19 is a diagram showing an example of a characteristic curve obtained by the ellipsometry of FIG. 18.

FIG. 19 shows the relationship between the reflection coefficient ratio (tanψ=Rp/Rs) and the pattern width W obtained according to the construction of FIG. 18 that uses the scattering of the incident optical beam. In the example of FIG. 19, it should be noted that a wafer carrying a line-and-space pattern having a thickness of 180 nm and a pattern pitch of 300 nm on a $SiO_2$ film of a thickness of 100 nm is used as the substrate 22, wherein the pattern width W is changed between 120 nm and 180 nm. The ellipsometric measurement was made by using a linearly polarized beam having a polarization angle of 45° as the incident optical beam.

As will be seen from FIG. 19, the reflectance coefficient ratio tanψ clearly shows a dependency on the pattern width W. This in turn means that it is possible to obtain the pattern width W of the line-and-space pattern from the reflection coefficient ratio tanψ of the scattered light.

FIFTH EMBODIMENT

In any of the ellipsometers of FIG. 5, FIG. 9, FIG. 11 or FIG. 17, the incident angle of the optical beam emitted from the optical source 23 is by no means limited to 70° but other incident angle may also be used. Further, by changing the incident angle variously, it is possible to evaluate not only the pattern width W but also the inclination angle of the pattern side wall by referring to a database that includes the incident angle as a parameter in addition to the foregoing ellipsometric parameters ψ and Δ.

FIG. 20 shows the ellipsometric parameters ψ and Δ obtained from a reflection beam produced by a wafer in which a polysilicon film is formed with a thickness of 182 nm on a $SiO_2$ film having a thickness of 102 nm.

Referring to FIG. 20, it should be noted that the parameters ψ and Δ are obtained as indicated in the upper left curve of FIG. 20 in the state in which the etching of the polysilicon film is not started yet and only a line-and-space resist pattern is formed on the polysilicon film with pattern widths W of 175 nm, 150 nm and 125 nm. In FIG. 20, it should be noted that three measurements, represented by an open circle, an open triangle and an open square, were made for each of the pattern widths W of 175 nm, 150 nm and 125 nm, wherein it is noted that the convergence of these measurements are excellent. The data of FIG. 20 was taken by setting the incident angle of the optical beam to 70°.

Next, an etching is applied to the foregoing polysilicon film wile using the line-and-space resist pattern as a mask and the ellipsometric measurement was made upon the structure thus obtained, wherein the solid triangles represent the parameters ψ and Δ obtained for the structure in which the etching is stopped immediately upon exposure of the underlying $SiO_2$ film (0% prolonged etching). On the other hand, the solid squares represent the parameters ψ and Δ obtained for the structure in which the etching is continued for a duration of 30% the nominal duration of etching (30% prolonged etching), after the underlying $SiO_2$ film is exposed. Further, the solid circles represent the parameters ψ and Δ for the structure in which the etching is continued for a duration of 80% the nominal duration of etching (80% prolonged etching), after underlying SiO$_2$ film is exposed.

Figure 21A:
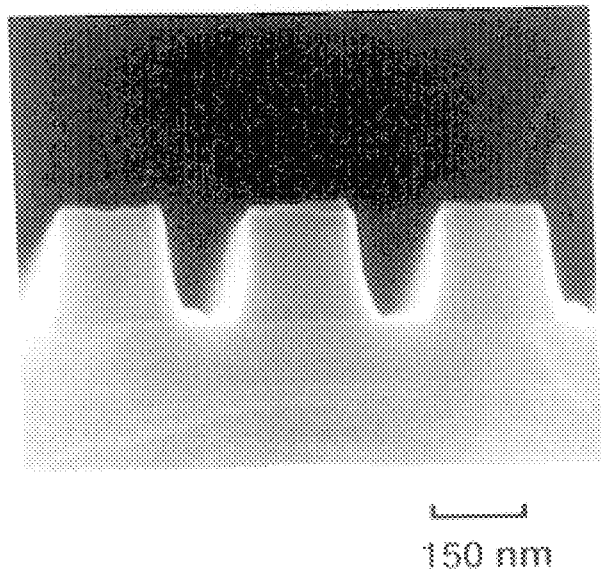
FIGS. 21A–21C are diagrams showing various cross sectional shapes of the line-and-space patterns corresponding to FIG. 20.
Figure 21B:
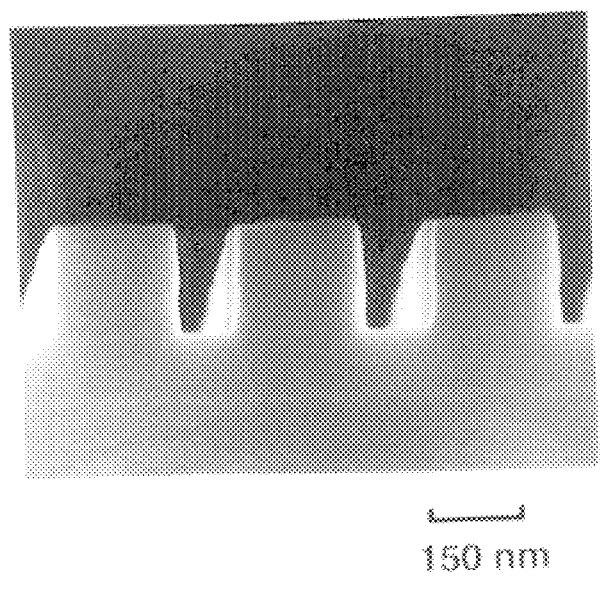
Figure 21C:
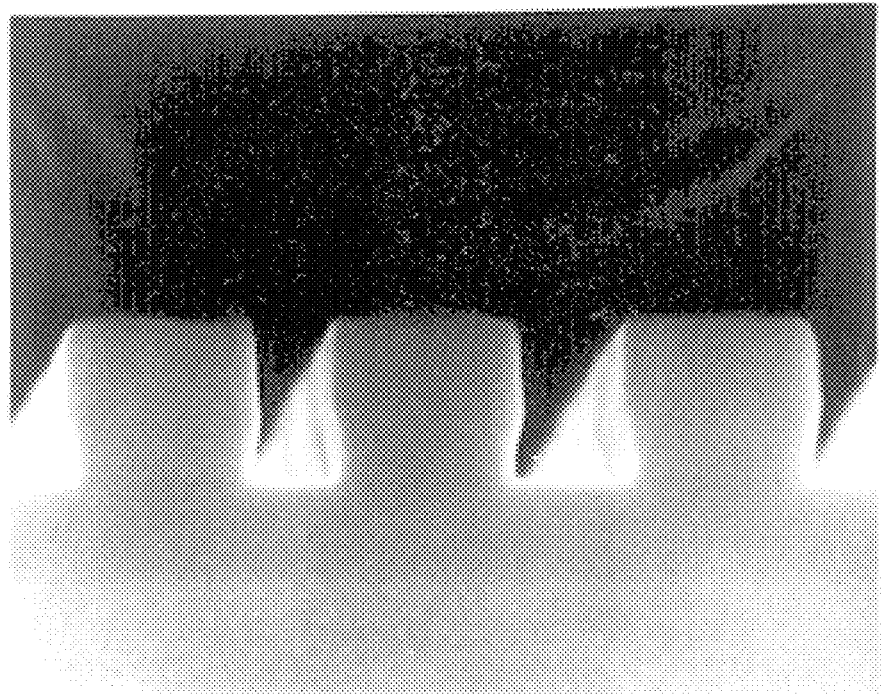

The structure corresponding to the solid triangles is represented in FIG. 21A for the case in which the pattern width W is 150 nm, the structure corresponding to the solid squares is represented in FIG. 21B for the case in which the pattern width W is also 150 nm, and the structure corresponding to the solid circles is represented in FIG. 21C for the case in which the pattern width W is again 150 nm, wherein FIGS. 21A–21C show the cross-section of the polysilicon line-and-space patterns obtained by a SEM observation.

As will be seen clearly from FIG. 20, the curves for the various prolonged etchings are different from each other, except for the case where the pattern width W is set to 175 nm. Only in this case, the curves overlap partially. This means that it is generally possible to evaluate also the cross sectional shape of the polysilicon patterns as represented in FIGS. 21A–21C, from the combination of the ellipsometric parameters ψ and Δ, when it is possible to estimate the structural parameters of the line-and-space pattern such as the pattern width W, film thickness, refractive index, and the like, by some other means.

SIXTH EMBODIMENT

Figure 22:
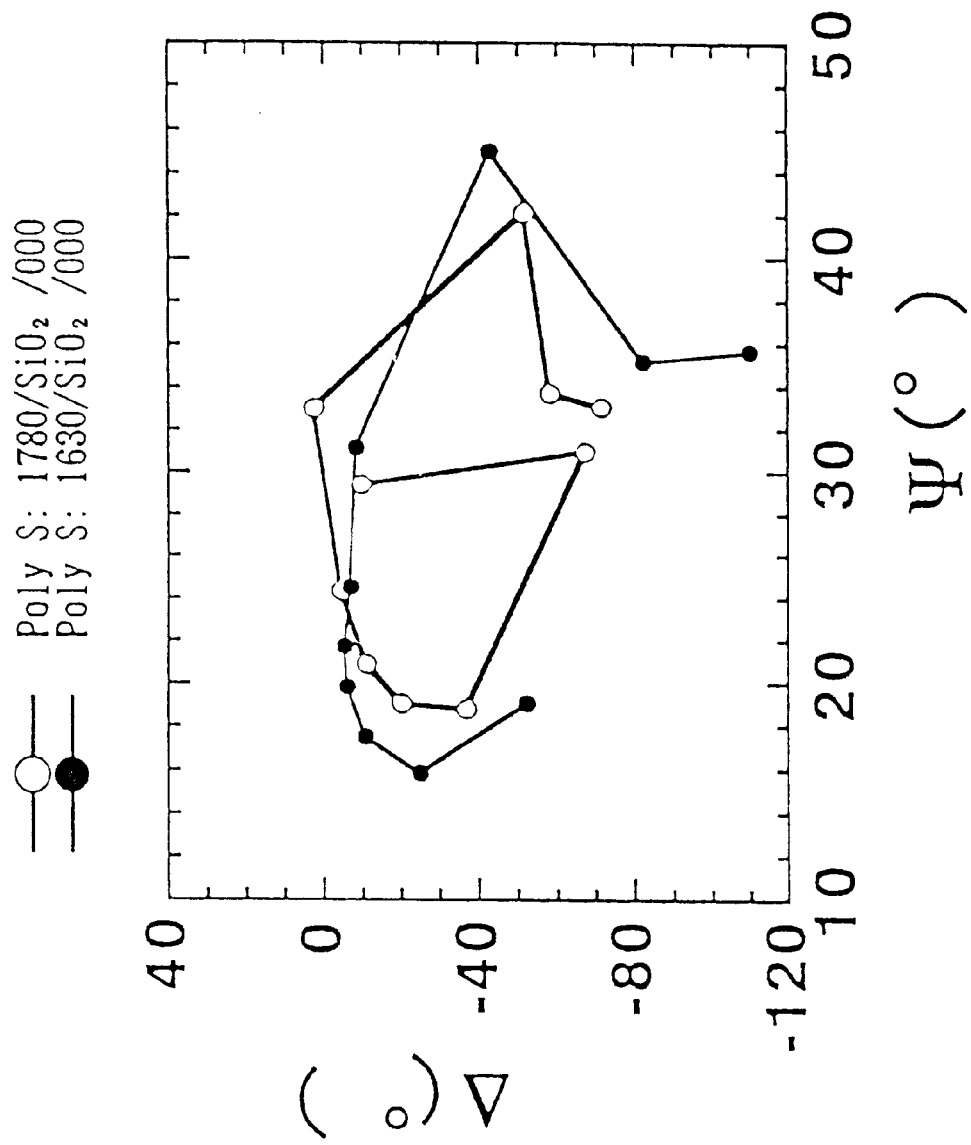
FIG. 22 is a diagram showing the effect of pattern thickness on the ellipsometric parameters $\psi$ and $\Delta$ according to a sixth embodiment of the present invention.

FIG. 22 shows the relationship between the ellipsometric parameters ψ and _ of the same polysilicon line-and-space pattern for the case in which the thickness of the polysilicon film is changed variously on the SiO$_2$ film of which thickness is set to 100 nm, wherein the curve represented in FIG. 22 by solid circles represent the case in which the polysilicon line-and-space pattern has a thickness of 178 nm, while the curve represented by open circles represent the case in which the polysilicon line-and-space pattern has a thickness of 163 nm. In any of these cases, the line-and-space pattern was formed to have a pitch of 300 nm, and the width W is changed in the range between 110–200 nm.

As will be seen clearly in FIG. 22, the curve for the 178 nm thickness is distinctly different from the curve for the 163 nm thickness. This in turn means that it is possible to apply the ellipsometric process of the present invention for the patterns of various thicknesses by measuring the pattern thickness before proceeding to the ellipsometric process.

FIG. 23 shows the flowchart of such a process that includes the step of measuring the film thickness according to a sixth embodiment of the present invention.

Referring to FIG. 23, a step 11 is conducted at first for determining the thickness of the line-and-space pattern, and a step 12 is conducted subsequently for selecting the characteristic curve for the measured thickness of the line-and-space pattern. Further, an ellipsometric process is conducted in a step 13 for the parameters ψ and Δ, and the pattern width W or the cross sectional shape thereof is obtained based upon the characteristic curve thus selected.

Further, the present invention is not limited to the embodiments described heretofore, but various variations and modifications may be made without departing from the scope of the invention.

What is claimed is:

1. A method of measuring a size of a structure formed on a surface of a substrate, comprising the steps of:

storing in a database data representing a relationship between lateral size and polarization;

illuminating said structure by an incident optical beam incident to said structure with a predetermined angle with respect to said surface;

measuring a polarization state of an exiting optical beam from said structure in response to an illumination of said structure by said incident optical beam; and evaluating a lateral size of said structure from said polarization state of said exiting optical beam according to said data stored in said database.

2. A method as claimed in claim 1, wherein said polarization state is represented in terms of a rotation of a polarization plane and an ellipticity of said exiting optical beam, and wherein said measuring step is carried out by an ellipsometer.

3. A method as claimed in claim 1, wherein said illuminating step is carried out for different incident angles of said incident optical beam, and wherein said evaluating step includes a step of evaluating an angle of a side wall of said structure with respect to said surface of said substrate from a combination of said polarization state and said incident angle.

4. A method as claimed in claim 1, wherein said measuring step is carried out by using a reflection beam of said incident optical beam as said exiting optical beam.

5. A method as claimed in claim 1, wherein said measuring step is carried out by using a diffraction optical beam of said incident optical beam diffracted by said structure as said exiting optical beam.

6. A method as claimed in claim 1, wherein said measuring step is carried out by using a scattered light of said incident optical beam scattered by said structure as said exiting optical beam.

7. A method as claimed in claim 1, wherein said evaluating step includes the substeps of measuring a thickness of said structure, selecting a database corresponding to said measured thickness, and evaluating one of a width and a cross-sectional shape of said structure by referring to said selected database.

8. A method as claimed in claim 1, wherein said illuminating step includes a step of switching said incident optical beam on and off, and wherein said evaluating step measures said polarization state of said exiting optical beam for each of a state in which said incident optical beam is turned on and a state in which said incident optical beam is turned off.

9. A method for controlling a quality of a semiconductor device, comprising the steps of a semiconductor device, comprising the steps of:

storing in a database data representing a relationship between lateral size and polarization;

illuminating a structure formed on a surface of a substrate by an incident optical beam incident to said structure with a predetermined angle with respect to said surface;

measuring a polarization state of an exiting optical beam exiting from said structure in response to an illumination of said structure by said incident optical beam;

evaluating a lateral size of said structure from said polarization state of said exiting optical beam according to said data stored in said database; and adjusting a parameter of production of a semiconductor device in response to said size.

10. A method as claimed in claim 1, wherein said database stores said relationship in the form of curves.

11. A method as claimed in claim 9, wherein said database stores said relationship in the form of curves.

* * * * *

(12) EX PARTE REEXAMINATION CERTIFICATE (6815th)
United States Patent
Arimoto

(10) Number: US 6,104,486 C1
(45) Certificate Issued: May 12, 2009

(54) FABRICATION PROCESS OF A SEMICONDUCTOR DEVICE USING ELLIPSOMETRY

(75) Inventor: Hiroshi Arimoto, Kawasaki (JP)

(73) Assignee: Fujitsu Limited, Nakahara-Ku, Kawasaki (JP)

Reexamination Request:
No. 90/008,738, Jun. 29, 2007

Reexamination Certificate for:
Patent No.: 6,104,486
Issued: Aug. 15, 2000
Appl. No.: 08/774,272
Filed: Dec. 27, 1996

(30) Foreign Application Priority Data

Dec. 28, 1995 (JP) .............................................. 7-343924

(51) Int. Cl.
*G01J 4/00* (2006.01)
*G01B 11/02* (2006.01)

(52) U.S. Cl. .......................... 356/300; 356/305; 356/310; 356/322; 356/337; 356/340; 356/364; 356/128; 356/492; 250/492.1; 250/492.2; 250/492.22; 250/492.3

(58) Field of Classification Search .................... None
See application file for complete search history.

(56) References Cited

U.S. PATENT DOCUMENTS

| | | | | |
|---|---|---|---|---|
| 4,264,822 A | * | 4/1981 | Ueno et al. | 250/492.3 |
| 5,262,258 A | * | 11/1993 | Yanagisawa | 430/22 |
| 5,355,212 A | | 10/1994 | Wells et al. | |
| 5,432,607 A | | 7/1995 | Taubenblatt | |
| 5,498,500 A | * | 3/1996 | Bae | 430/22 |
| 5,739,909 A | | 4/1998 | Blayo et al. | |

* cited by examiner

*Primary Examiner*—Lynne H. Browne

(57) ABSTRACT

A method of fabricating a semiconductor device includes the steps of illuminating a structure formed on a surface of a substrate by an incident optical beam incident to the structure with a predetermined incident angle with respect to the surface, measuring a polarization state of an exiting optical beam exiting from the structure in response to an illumination of the structure by the incident optical beam, and evaluating a size of the structure in a direction parallel to the surface from the polarization state of the exiting optical beam, and adjusting a parameter of production of a semiconductor device in response to the size.

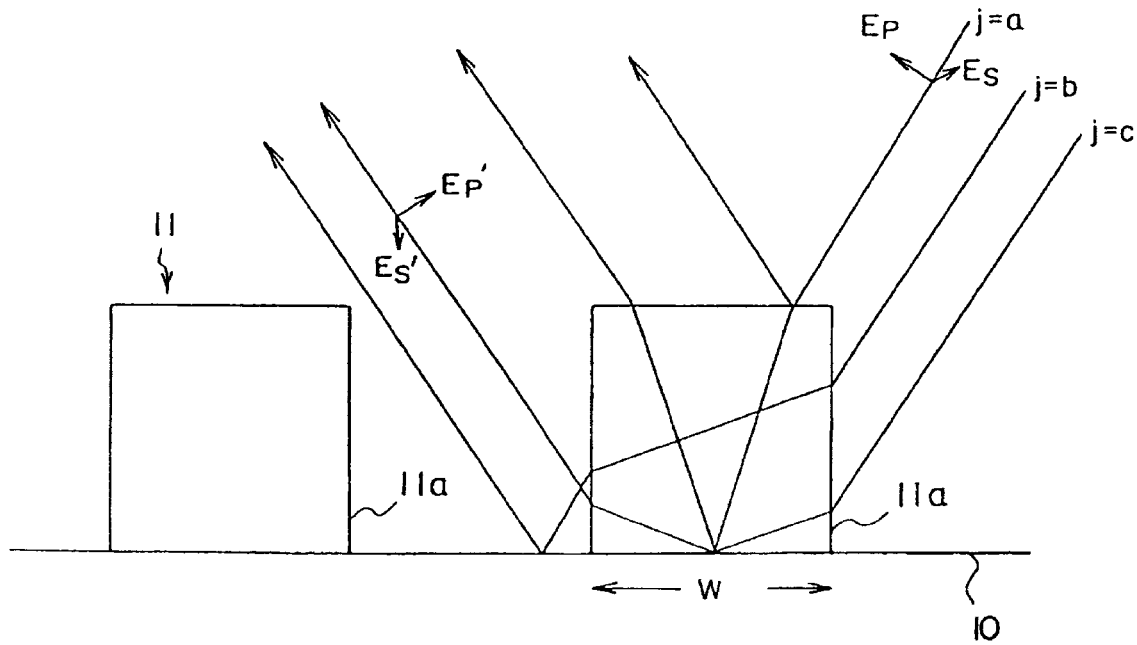

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–11 are cancelled.

New claims 12 and 13 are added and determined to be patentable.

*12. A method of measuring a size of a mask pattern formed on a surface of a substrate, comprising the steps of:*

*storing in a database data representing a relationship between lateral size and elliptic polarization;*

*illuminating said mask pattern by an incident optical beam incident to said mask pattern with a predetermined angle with respect to said surface;*

*measuring an elliptic polarization state of an exiting optical beam from said mask pattern in response to said illuminating of said mask pattern by said incident optical beam; and*

*evaluating a lateral size of said mask pattern from said elliptic polarization state of said exiting optical beam according to said data stored in said database,*

*wherein said database includes a first database and a second database,*

*wherein said storing stores measured data representing the relationship between lateral size and elliptic polarization in said first database, and stores theoretically calculated data representing the relationship between lateral size and elliptic polarization in said second database,*

*wherein said evaluating evaluates the lateral size of said mask pattern from said elliptic polarization state of said exiting optical beam alternately according to said measured data stored in said first database and said theoretically calculated data in said second database, and*

*wherein said theoretically calculated data in said second database is calculated based on a thickness of the mask pattern, a refractive index of the mask pattern, a thickness of an underlying layer and a refractive index of an underlying layer.*

*13. A method for controlling a quality of a semiconductor device, comprising the steps of:*

*storing in a database data representing a relationship between lateral size and elliptic polarization;*

*illuminating a mask pattern formed on a surface of a substrate by an incident optical beam incident to said mask pattern with a predetermined angle with respect to said surface;*

*measuring an elliptic polarization state of an exiting optical beam from said mask pattern in response to said illuminating of said pattern by said incident optical beam;*

*evaluating a lateral size of said mask pattern from said elliptic polarization state of said exiting optical beam according to said data stored in said database; and*

*adjusting a parameter of production of said semiconductor device in response to said lateral size,*

*wherein said database includes a first database and a second database,*

*wherein said storing stores measured data representing the relationship between lateral size and elliptic polarization in said first database, and stores theoretically calculated data representing the relationship between lateral size and elliptic polarization in said second database,*

*wherein said evaluating evaluates the lateral size of said mask pattern from said elliptic polarization state of said exiting optical beam alternately according to said measured data stored in said first database and said theoretically calculated data in said second database, and*

*wherein said theoretically calculated data in said second database is calculated based on a thickness of the mask pattern, a refractive index of the mask pattern, a thickness of an underlying layer and a refractive index of an underlying layer.*

* * * * *